United States Patent
Park et al.

(10) Patent No.: US 10,726,258 B2
(45) Date of Patent: Jul. 28, 2020

(54) IMAGING SENSOR ASSEMBLY HAVING TILTING STRUCTURE AND ELECTRONIC DEVICE INCLUDING THE SAME

(71) Applicant: Samsung Electronics Co., Ltd., Gyeonggi-do (KR)

(72) Inventors: Jinwoo Park, Gyeongsangbuk-do (KR); Min-Soo Kim, Gyeongsangbuk-do (KR); Jae-Il Seo, Gyeonggi-do (KR); Soonwoong Yang, Gyeonggi-do (KR); Kyujin Kwak, Daegu (KR); Kijae Kim, Seoul (KR); Jin-Wan An, Daegu (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/013,475

(22) Filed: Jun. 20, 2018

(65) Prior Publication Data
US 2019/0012544 A1    Jan. 10, 2019

(30) Foreign Application Priority Data

Jul. 4, 2017 (KR) .................... 10-2017-0084750

(51) Int. Cl.
*G06K 9/00* (2006.01)
*H04M 1/02* (2006.01)
(Continued)

(52) U.S. Cl.
CPC ......... *G06K 9/00604* (2013.01); *G06K 9/209* (2013.01); *H04M 1/0264* (2013.01);
(Continued)

(58) Field of Classification Search
CPC .................... G06K 9/00604; H04N 5/2253
See application file for complete search history.

(56) References Cited

U.S. PATENT DOCUMENTS

| 9,344,539 B2 | 5/2016 | Wang et al. |
| 2014/0232607 A1* | 8/2014 | Lee ........................ H01Q 1/526 343/841 |

(Continued)

FOREIGN PATENT DOCUMENTS

| KR | 1020000035840 | 6/2000 |
| KR | 10-2017-0028941 | 3/2017 |
| KR | 10-2018-0013251 | 2/2018 |

OTHER PUBLICATIONS

International Search Report dated Sep. 21, 2018 issued in counterpart application No. PCT/KR2018/006896, 15 pages.

*Primary Examiner* — Girumsew Wendmagegn
(74) *Attorney, Agent, or Firm* — The Farrell Law Firm, P.C.

(57) ABSTRACT

An electronic device is provided. The electronic device includes a housing including a front plate and a rear plate; a touch screen display operably coupled to the front plate; at least one through-hole operably disposed on the front plate; and an imaging sensor assembly facing the front plate at an acute angle with respect to the front plate. The imaging sensor assembly includes a barrel at least partially disposed in the through-hole; a plurality of lenses disposed inside the barrel; a sensor housing surrounding at least part of an outer surface of the barrel; an image sensor assembly comprising an image sensor disposed inside the sensor housing; and a processor electrically coupled to the image sensor and configured to detect an iris image.

19 Claims, 33 Drawing Sheets

(51) Int. Cl.
*H04N 5/369* (2011.01)
*H04N 5/225* (2006.01)
*G06K 9/20* (2006.01)

(52) U.S. Cl.
CPC ......... *H04N 5/2252* (2013.01); *H04N 5/2253* (2013.01); *H04N 5/2254* (2013.01); *H04N 5/2257* (2013.01); *H04N 5/369* (2013.01); *H04M 1/0266* (2013.01)

(56) References Cited

U.S. PATENT DOCUMENTS

| | | |
|---|---|---|
| 2015/0323755 A1* | 11/2015 | Kwon ................... G02B 7/04 359/823 |
| 2015/0350497 A1 | 12/2015 | Gamadia et al. |
| 2016/0037036 A1* | 2/2016 | Lim ................... H04N 5/2257 348/374 |
| 2017/0171440 A1 | 6/2017 | Park et al. |
| 2017/0193295 A1 | 7/2017 | Kim et al. |
| 2018/0032813 A1 | 2/2018 | Lee |

* cited by examiner

IMAGING SENSOR ASSEMBLY HAVING TILTING STRUCTURE AND ELECTRONIC DEVICE INCLUDING THE SAME

CROSS-REFERENCE TO RELATED APPLICATION(S)

This application is based on and claims priority under 35 U.S.C. § 119(a) to Korean Patent Application Serial No. 10-2017-0084750, which was filed on Jul. 4, 2017, in the Korean Intellectual Property Office, the entire disclosure of which is incorporated herein by reference.

BACKGROUND

1. Field

The disclosure relates, generally, to an electronic device, and more particularly, to an electronic device including an imaging sensor assembly having a tilting structure.

2. Description of Related Art

Electronic devices for mobile communication are known. The electronic devices can be equipped with various security systems for security authentication of specific users. For example, the security systems may use specific biometric information of a specific user during a security authentication process. The biometric security system may include a face recognition system, a fingerprint recognition system, or an iris recognition system.

With respect to the iris recognition system, an iris pattern (or design) is different for each user, and even an iris pattern of twins can have a completely different shape. Since an iris pattern does not change during the lifetime of a person, the iris recognition system has been adopted as a next-generation security system.

For example, an electronic device for mobile communication may include an iris camera (e.g., an imaging sensor assembly) for use with a security authentication method. The recognition system using the iris camera may recognize a user's iris such that light of a light source (e.g., an infrared LED, an infrared LED, etc.), which is spaced apart from the iris camera with a regular interval in the same direction, is irradiated, and corresponding reflected light is captured by the iris camera (e.g., the imaging sensor assembly).

When the electronic device for mobile communication includes a communication receiver disposed at an upper center of the electronic device for communication with another party, the iris camera and the light source may be disposed around the receiver. The iris camera may be disposed in a tilting structure to face a center of the user's face at a specific angle such that an angle of view can be made to face the center of the user's face.

The tilting structure of the iris camera may use a bracket for supporting the iris camera, thereby allowing an outer surface of the iris camera to be tilted at a specific angle in a housing of the electronic device. However, an overall size of the electronic device may need to be increased or a black matrix (BM) region of the electronic device may need to be expanded to accommodate a hole size of a lens barrel of the iris camera, which will need to be increased as a result of a size of the bracket and the inclined manner in which the bracket is mounted.

SUMMARY

The disclosure has been made to address at least the disadvantages described above and to provide at least the advantages described below.

An aspect of the disclosure provides an imaging sensor assembly having a tilting structure capable of reducing a size of an electronic device when compared to conventional electronic devices that use iris recognition systems.

An aspect of the disclosure provides an imaging sensor assembly having a tilting structure that prevents expansion of a BM region of an electronic device.

In accordance with an embodiment, there is provided an electronic device. The electronic device includes a housing including a front plate, a touch screen display operably coupled to the front plate, at least one through-hole operably disposed on the front plate, and an imaging sensor assembly including a barrel at least partially disposed in the through-hole, a plurality of lenses disposed inside the barrel, a sensor housing surrounding at least part of an outer surface of the barrel, an image sensor assembly comprising an image sensor disposed inside the sensor housing, and a processor electrically coupled to the imaging sensor and configured to detect an iris image.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
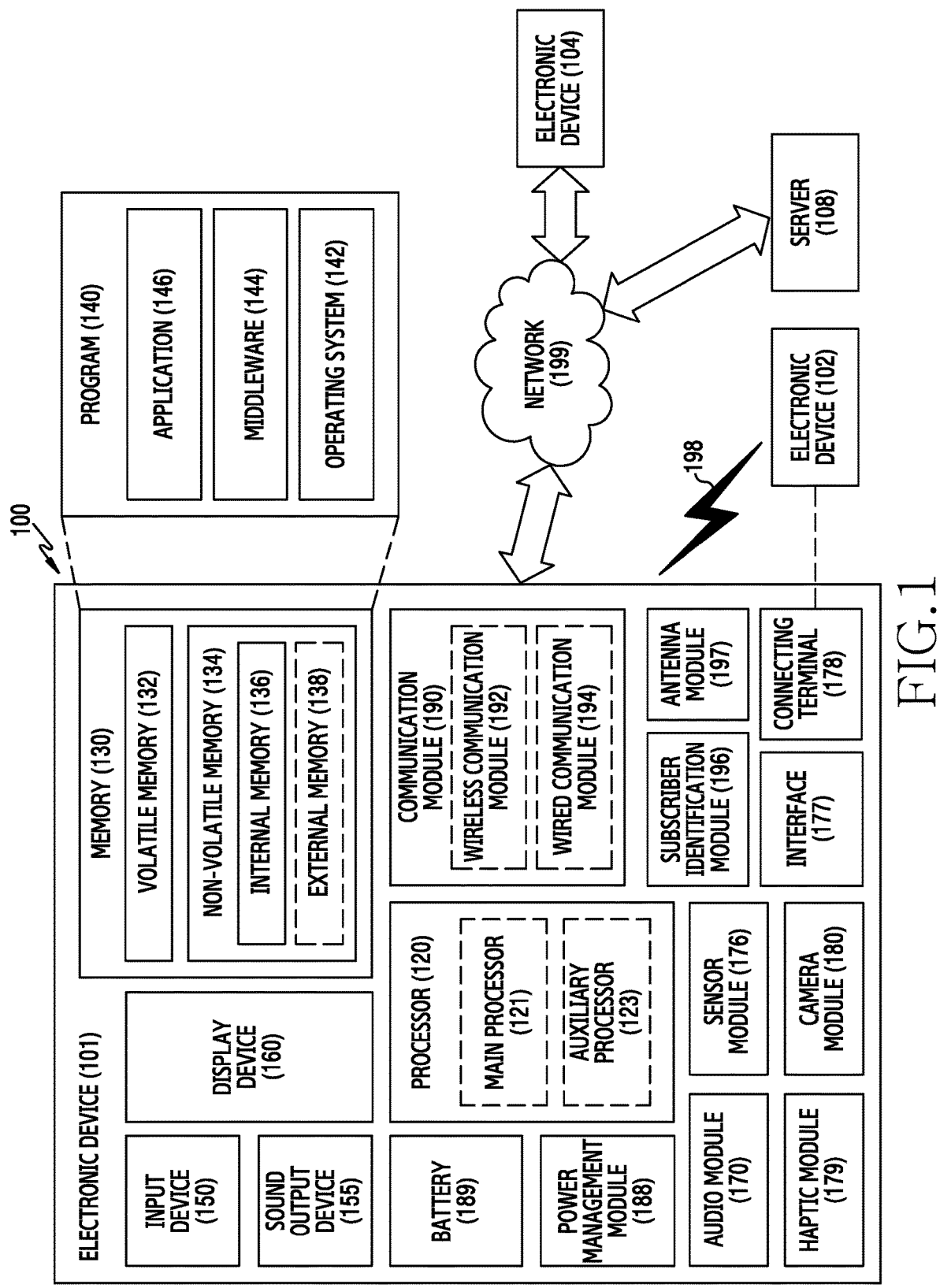
FIG. 1 is a diagram of an electronic device in a network environment 100, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" may indicate a person using an electronic device or a device (e.g., an artificial intelligence electronic device) using an electronic device.

FIG. 1 is a diagram of an electronic device 101 in a network environment 100, according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108.

The electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. At least one of the components (e.g., the display device 160 or the camera module 180) may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be embedded in the display device 160 (e.g., a display).

The processor 120 may execute software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of the functions or states related to at least one component (e.g., the display device 160, the sensor module 176, or the communication module 190) among the components of the electronic device 101, instead of the main processor 121, e.g., while the main processor 121 is in an inactive (e.g., sleep) state, or together with the main processor 121 while the main processor 121 is in an active state (e.g., executing an application). The auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include software (e.g., the program 140) and input data or output data for a command related thereto. The memory 130 may include the volatile memory 132 or the non-volatile memory 134.

The program 140 may be stored in the memory 130 as software, and may include an operating system (OS) 142, middleware 144, or an application 146.

The input device 150 may receive a command or data to be used by other components (e.g., the processor 120) of the electronic device 101, from the user of the electronic device 101. The input device 150 may include a microphone, a mouse, or a keyboard.

The sound output device 155 may output sound signals of the electronic device 101. The sound output device 155 may include a speaker or a receiver. The speaker may be used for general purposes, such as playing multimedia or playing record, and the receiver may be used for incoming calls. The receiver may be implemented as separate from, or as part of the speaker.

The display device 160 may visually provide information to a user of the electronic device 101. The display device 160 may include a display, a hologram device, or a projector and control circuitry to control a corresponding one of the display, hologram device, and projector. The display device 160 may include touch circuitry adapted to detect a touch input, or sensor circuitry (e.g., a pressure sensor) adapted to measure the intensity of force incurred by the touch input.

The audio module 170 may convert a sound into an electrical signal and vice versa. The audio module 170 may obtain the sound via the input device 150, or output the sound via the sound output device 155 or a headphone of an external electronic device 102 directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. The sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101, which is to be coupled with the external electronic device 102 directly or wirelessly. The interface 177 may include a high definition multimedia interface (HDMI), a universal serial bus (USB) interface, a secure digital (SD) card interface, or an audio interface.

A connecting terminal 178 may include a connector via which the electronic device 101 may be physically connected with the external electronic device 102. The connecting terminal 178 may include a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include a motor, a piezoelectric element, or an electric stimulator.

The camera module 180 may capture a still image or moving images, and may include one or more lenses, image sensors, image signal processors, or flashes.

The power management module 188 may manage power supplied to the electronic device 101. The power management module 188 may be implemented as at least part of a power management integrated circuit (PMIC).

The battery 189 may supply power to at least one component of the electronic device 101, and the battery 189 may include a primary cell which is not rechargeable, a secondary cell which is rechargeable, or a fuel cell.

The communication module 190 may establish a direct (e.g., wired) communication channel or a wireless communication channel between the electronic device 101 and the electronic device 102, the electronic device 104, or the server 108 and communicate via the established communication channel. The communication module 190 may include one or more communication processors that are operable independently from the processor 120 (e.g., AP) and supports a direct communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as bluetooth (BT)™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the electronic device 101. The antenna module 197 may include one or more antennas for a communication scheme used in the communication network, such as the first network 198 or the second network 199. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type from, the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used.

Various embodiments as set forth herein may be implemented as software (e.g., the program 140) including one or more instructions that are stored in a storage medium (e.g., internal memory 136 or external memory 138) that is readable by a machine the electronic device 101. For example, the processor 120 of the electronic device 101 may invoke at least one of the one or more instructions stored in the storage medium, and execute it, with or without using one or more other components under the control of the processor. This allows the electronic device 101 to perform at least one function according to the at least one instruction invoked. The one or more instructions may include a code generated by a complier or a code executable by an interpreter. The machine-readable storage medium may be provided in the form of a non-transitory storage medium. The term "non-transitory" is defined as a tangible device, and does not include a signal (e.g., an electromagnetic wave), but this term does not differentiate between where data is semi-permanently stored in the storage medium and where the data is temporarily stored in the storage medium.

A method of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2A:
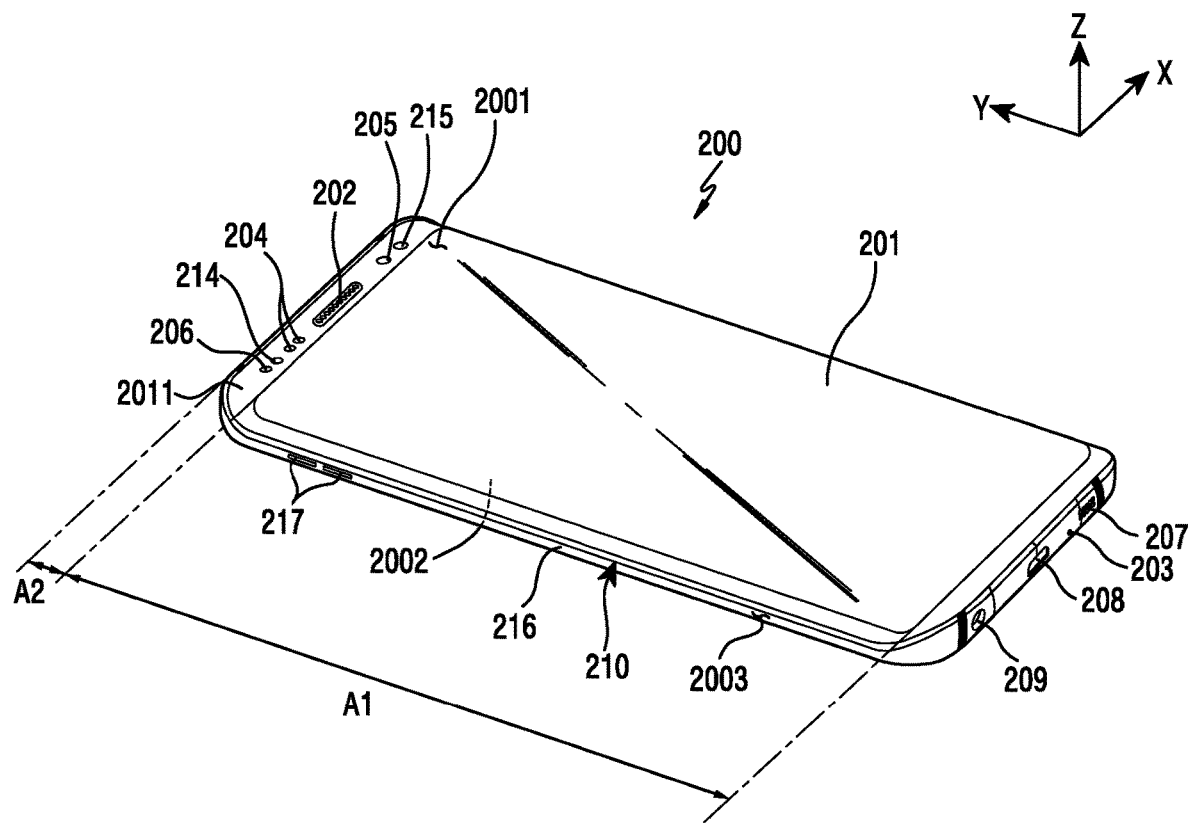
FIGS. 2A and 2B are perspective views of an electronic device, according to an embodiment.
Figure 2B:
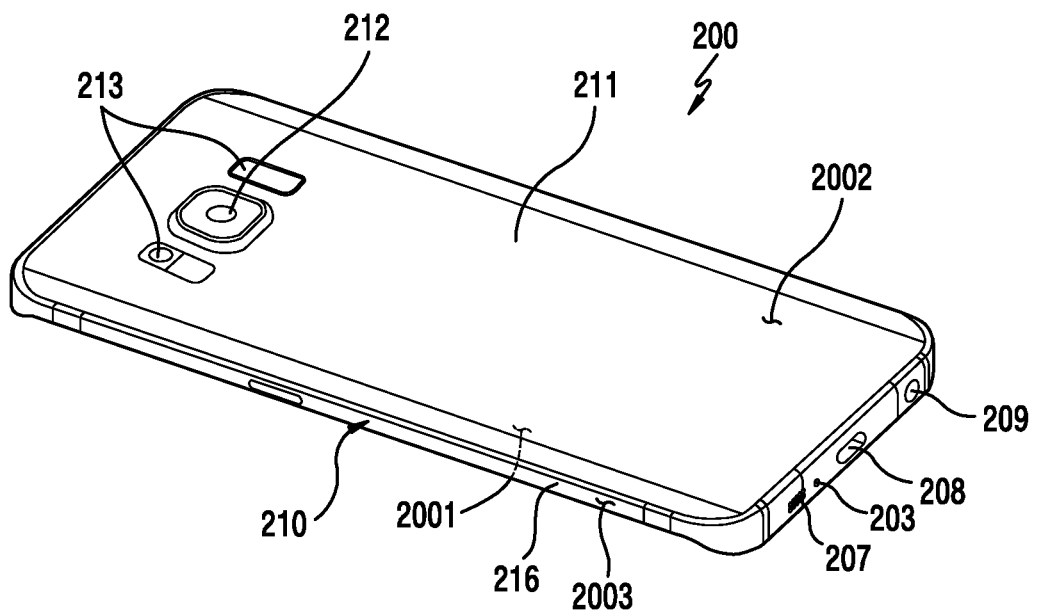

FIGS. 2A and 2B are perspective views of an electronic device 200, according to an embodiment. The electronic device 200 and the electronic devices that are described below can include all or some of the components of the electronic device 100.

FIG. 2A is a front perspective view of an electronic device, and FIG. 2B is a rear perspective view of the electronic device 200.

Referring to FIG. 2A and FIG. 2B, an electronic device 200 may include a housing 210. The housing 210 may be constructed of a conductive member and/or a non-conductive member. The housing 210 may include a first side 2001 (e.g., a front side or an upper side) facing in a first direction (e.g., a Z-axis direction), a second side 2002 (e.g., a rear side or a lower side) disposed in a direction facing the first side 2001, and a lateral side 2003 disposed to surround at least part of the first side 2001 and the second side 2002. The lateral side 2003 may be coupled to a front plate 2011 and a rear plate 211, and may be constructed based on a lateral member 216 including a metal and/or a polymer. The electronic device 200 may include the front plate 2011 (e.g., a window or glass plate) disposed to the first side 2001, and may be disposed such that a display 201 is exposed through a first region A1 of the front plate 2011. The electronic device 200 may include a communication receiver hole 202. According to an embodiment, the electronic device 200 may be controlled to use a speaker disposed therein to speak with the other party via the communication receiver hole 202. The electronic device 200 may include a microphone hole 203. The electronic device 200 may use at least one microphone disposed therein and capable of sensing a sound direction, and may receive an external sound through the microphone hole 203 or transmit a user's voice to another party or user of another electronic device. The electronic device 200 may include at least one key input device, which may include at least one side key button 217 disposed to a lateral side (a lateral side 4103 of FIG. 4) of the housing 210. The at least one side key button 217 may include a volume control button, a wake-up button, or a button for performing a specific function (e.g., a function of executing artificial intelligence or a function of entering a fast speech recognition execution mode).

The electronic device 200 may include other components for performing various other functions of the electronic device 200. The other components may be accessible through the display 201 while performing a function through the front plate 2011. At least part of the components may be disposed through a second region A2 of the front plate 2011. The components may include at least one sensor module 204 that may include an illumination sensor (e.g., an optical sensor), a proximity sensor (e.g., an optical sensor), an infrared sensor, an ultrasonic sensor, a fingerprint sensor, a face recognition sensor, or an iris recognition sensor. The component may also include a first camera device 205, an indicator 206 (e.g., an LED device) for visually presenting status information of the electronic device 200 to a user, a light source 214 (e.g., an infrared LED) disposed to one side of the receiver 202, and an imaging sensor assembly 215 (e.g., an iris camera) to detect an iris image in a state where light generated from the light source 214 is irradiated around a user's eye. At least one of these components may be exposed through at least some regions of the second side 2002 (e.g., a rear side or a back side) facing in a second direction (e.g., −Z-axis direction) opposite to a first direction of the electronic device 200.

The electronic device 200 may include an external speaker hole 207. The electronic device 200 may use a speaker disposed therein to output a sound through the external speaker hole 207. The electronic device 200 may include a first connector hole 208 (e.g., an interface connector port) to charge the electronic device 200 using a data transmission/reception function and external power provided by an external device. The electronic device 200 may include a second connector hole 209 as part of an ear jack assembly to accommodate an ear jack of the external device.

The electronic device 200 may include the rear plate 211 (e.g., a rear window) disposed to the second side 2002. A rear camera device 212 may be disposed to the rear plate 211, and at least one electronic component 213 may be disposed around the rear camera device 212. The electronic component 213 may include at least one of an illumination sensor (e.g., an optical sensor), a proximity sensor (e.g., an optical sensor), an infrared sensor, an ultrasonic sensor, a heartrate sensor, a fingerprint recognition sensor, and a flash device.

The display 201 may include the front plate 2011 exposed through at least some regions of the first side 2001 of the electronic device 200. The display 201 may include a touch panel and display panel stacked on the rear side of the front plate 2011. An image displayed through the display panel may be provided to the user through the front plate 2011 of a transparent material. Various materials such as transparent glass or acrylic may be used as the front plate 2011.

The electronic device 200 may be waterproof, and may include at least one seal member for waterproofing the electronic device 200. At least one seal member may be disposed between the display 201 and the housing 210 and/or between the housing 210 and the rear plate 211.

Figure 3:
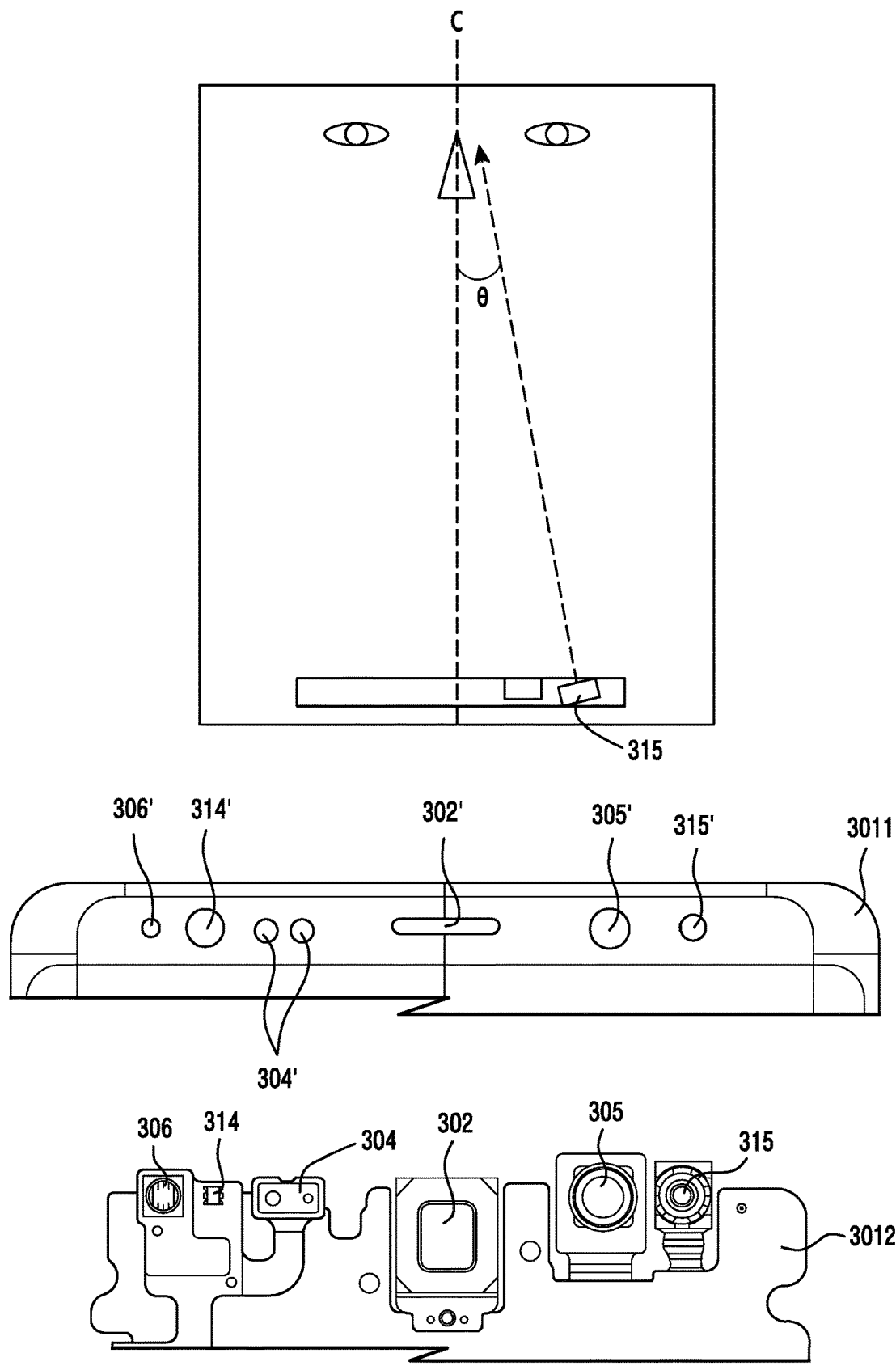
FIG. 3 is a diagram of a tilting arrangement structure of an imaging sensor assembly, according to an embodiment.

FIG. 3 is a diagram of a tilting arrangement structure of an imaging sensor assembly, according to an embodiment.

Referring to FIG. 3, electronic components disposed on the electronic device 200 of FIG. 2 may be electrically coupled to a printed circuit board 3012. The electronic components may include a first camera device 305 and an imaging sensor assembly 315 which are disposed on one side with respect to a communication receiver hole 302. The electronic components may have at least one sensor module 304, a light source 314, and an indicator 306 which are disposed on the other side of the communication receiver hole 302. The electronic components may be exposed through a front plate 3011 (. For example, the electronic components may be disposed at a black matrix (BM) region of the electronic device. The front plate 3011 may include a receiver arrangement region 302', a first camera arrangement region 305', an imaging sensor assembly arrangement region 315', a sensor module arrangement region 304', a light source arrangement region 314', and an indicator arrangement region 306' which correspond to the aforementioned electronic components. Each region may be transparently processed to detect an external environment or to inform a user of the status information of the electronic device.

The imaging sensor assembly 315 may be disposed at a position deviated towards one side by the communication receiver hole 302, which is disposed to a center of the electronic device. In order to move an angle of view to an eye center of a user looking at a centerline C of the electronic device due to the deviated arrangement, the imaging sensor assembly 315 may be tilted with a specific angle θ towards the centerline C.

The tilting structure of the imaging sensor assembly 315 provides an installation space, without the need for a bracket, thereby preventing the expansion of the BM region and decreasing a size of the electronic device by excluding an additional installation space.

Figure 4:
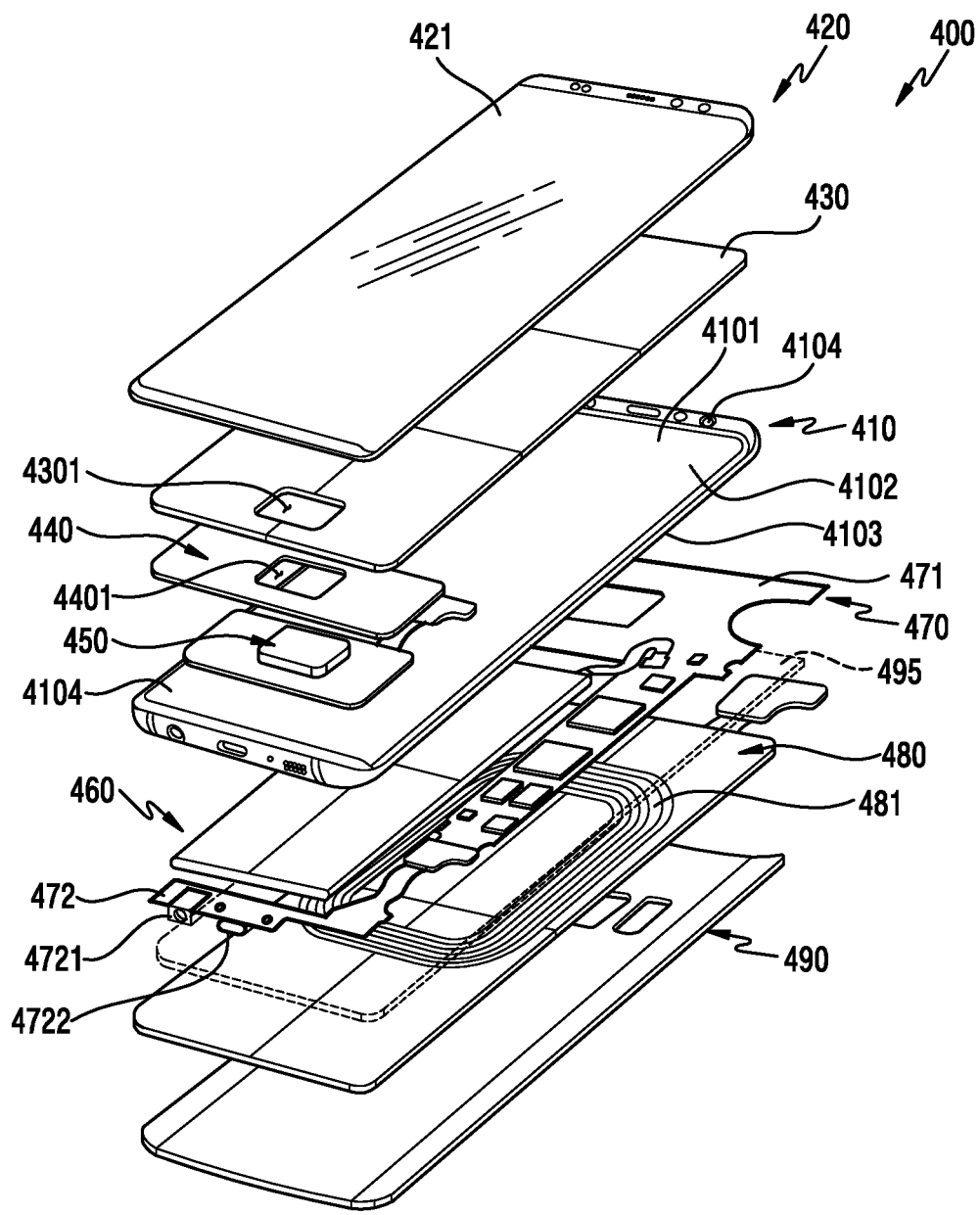
FIG. 4 is an exploded perspective view of an electronic device, according to an embodiment.

FIG. 4 is an exploded perspective view of an electronic device 400, according to an embodiment.

Referring to FIG. 4, the electronic device 400 may include a housing, which may include a front plate 420 including a display 421 disposed to a first side facing in a first direction, a rear plate 490 disposed to a second side facing the first side, and a lateral member 410 disposed between the front plate 420 and the rear plate 490. The lateral member 410 may include a first side 4101 facing in a first direction, a second side 4102 facing in a direction opposite to the first side 4101, and a lateral side 4103 surrounding a first support member 4104 between the first side 4101 and the second side 4102. The first support member 4104 may be constructed integrally or in combination with the lateral member 410. The first support member 4104 may include the lateral member 410, or the lateral member 410 may include the first support member 4104.

The electronic device 400 may include a fingerprint recognition sensor 450, a pressure sensor 440, and an electromagnetic resonance (EMR) sensor pad 430 which are disposed to the first side 4101 of the lateral member 410, and the display 421 exposed through at least some regions of the front plate 420. The electronic device 400 may include a battery 460, at least one printed circuit board 470, a second support member 495, a wireless power receiving member 480, and the rear plate 490 which are disposed to the second side 4102 of the lateral member 410.

The lateral member 410 may be constructed using a conductive material and a non-conductive material that are double injected. The lateral member 410 may include a region (e.g., the lateral side 4103) exposed to the outside from at least part of the electronic device 400. A conductive member of the lateral member 410 may be constructed of a conductive member through at least two non-conductive cut-off portions spaced apart by a regular interval to operate as an antenna radiator.

The fingerprint recognition sensor 450 may use a light source of the display 421 to receive reflected light when fingerprint contact is achieved/detected. The fingerprint recognition sensor 450 may receive reflected light by using a separate light source, and the fingerprint recognition sensor may operate in a capacitive (e.g., active capacitive or passive capacitive), ultrasound, or optical manner.

The pressure sensor 440 operates electrostatically, and may sense that a spacing between two electrode layers spaced apart by a dielectric changes by pressure. An electrostatic scheme may include a self-capacitance or mutual capacitance scheme.

The EMR sensor pad 430 may detect an electronic pen applied as a data input means. The EMR sensor pad 430 may operate in an electromagnetic induction manner to receive a feedback signal based on a resonance frequency of a coil included in the electronic pen. The fingerprint recognition sensor 450 may be disposed such that at least some regions thereof overlap with the pressure sensor 440 and the EMR sensor pad 430. The fingerprint recognition sensor 450 may be disposed such that the at least some regions thereof are in contact with the display through openings 4401 and 4301 which are disposed at corresponding positions of the pressure sensor 440 and the EMR sensor pad 430, respectively.

The battery 460 may be accommodated in an accommodation space provided in at least some regions of the lateral member 410, and may be disposed to avoid at least one printed circuit board 470. The battery 460 and the at least one printed circuit board 470 may be disposed in parallel relation, i.e., without overlapping.

The at least one printed circuit board 470 may include a main printed circuit board 471 and a sub printed circuit board 472 electrically coupled to the main printed circuit board 471. The main printed circuit board 471 may include an electrically connected imaging sensor assembly. The sub printed circuit board 472 may include an electrically coupled first connector hole 4722 (e.g., an interface connector port) and a second connector hole 4721 as part of an ear jack assembly.

The second support member 495 may be disposed such that at least some regions thereof are in contact with the lateral member 410. The second support member 495 may be constructed of a conductive material and/or a non-conductive material. Some regions of the second support member 495 may support at least some regions of an imaging sensor assembly disposed through the through-hole 4104 provided in a region of the lateral member 410 corresponding to the second region of the front plate 420.

A seal member may be disposed between the rear plate 490 and the lateral member 410 and/or between the lateral member 410 and the front plate 420, and the seal member may include tape, adhesive, waterproof material, silicone, waterproof rubber, urethane, or other suitable sealing material.

Figure 5A:
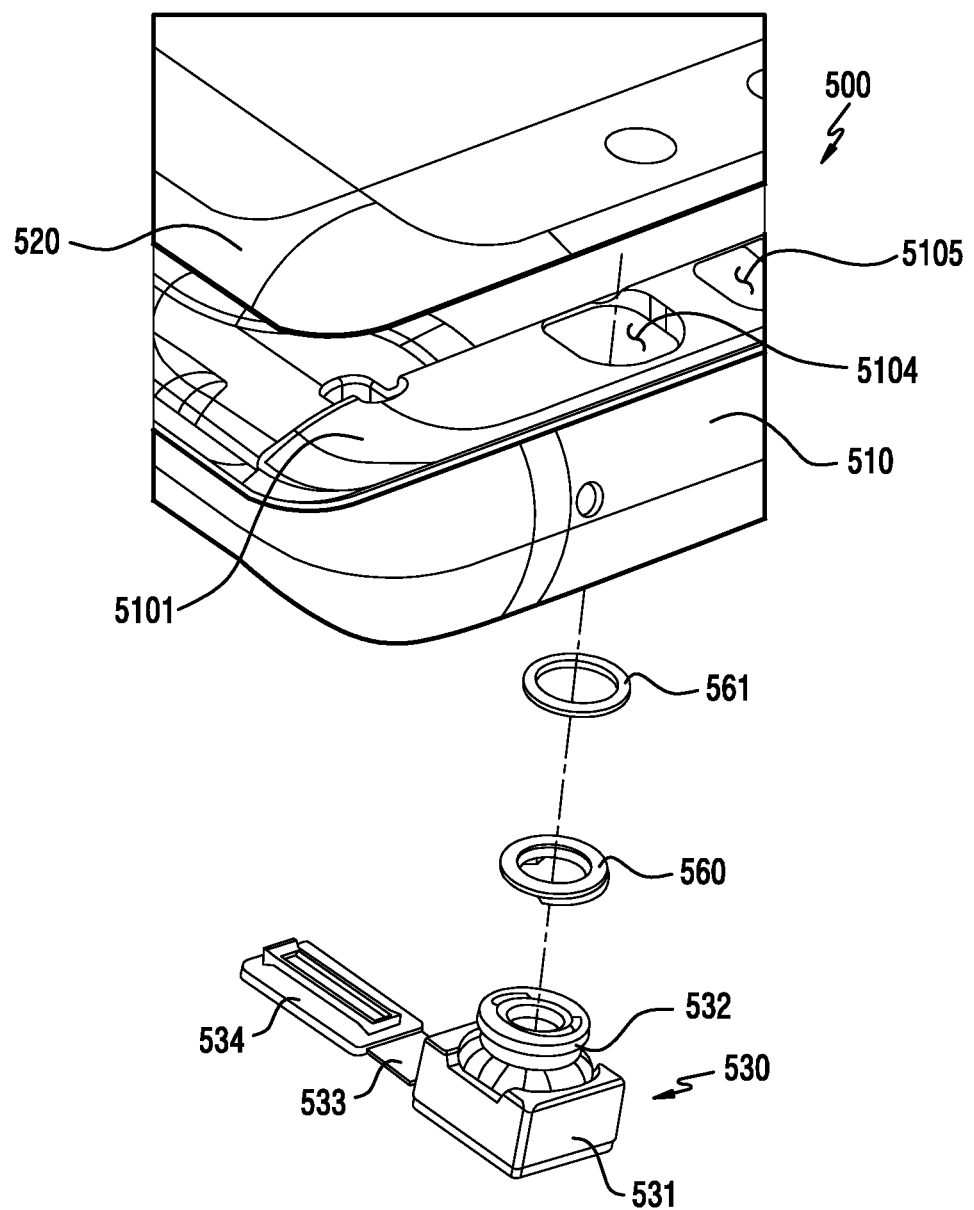
FIG. 5A is an exploded perspective view of an imaging sensor assembly, according to an embodiment.
Figure 5B:
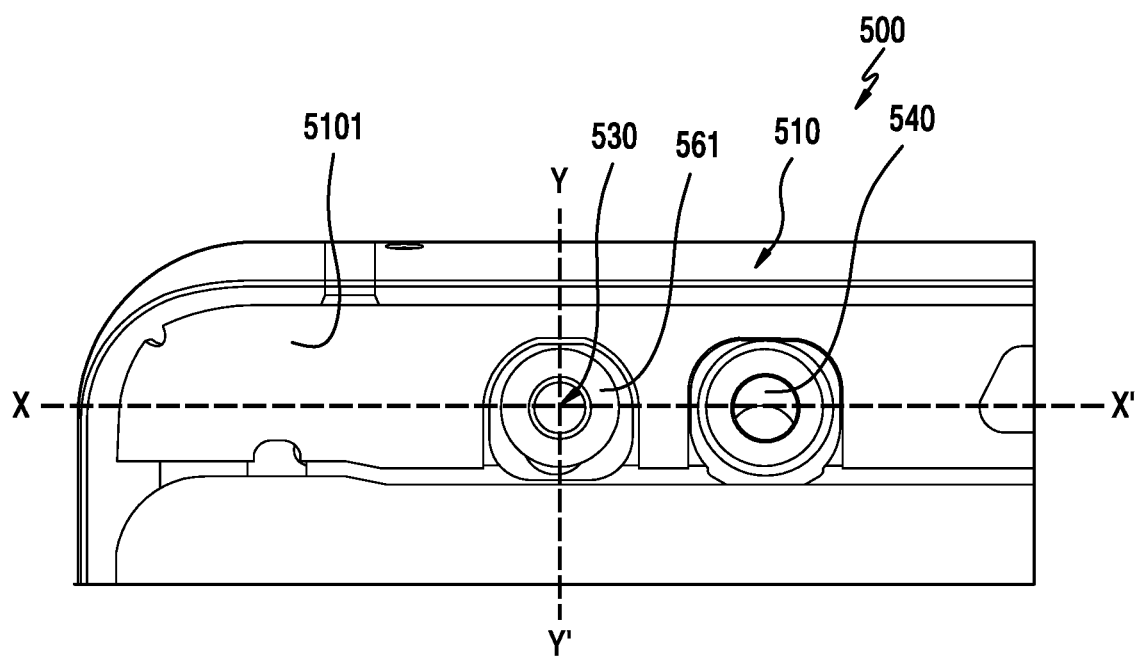
FIG. 5B is a diagram of an imaging sensor assembly that is mounted to a housing, according to an embodiment.

FIG. 5A is an exploded perspective view of an imaging sensor assembly, according to an embodiment. FIG. 5B is a diagram of an imaging sensor assembly that is mounted to a housing, according to an embodiment.

Figure 5C:
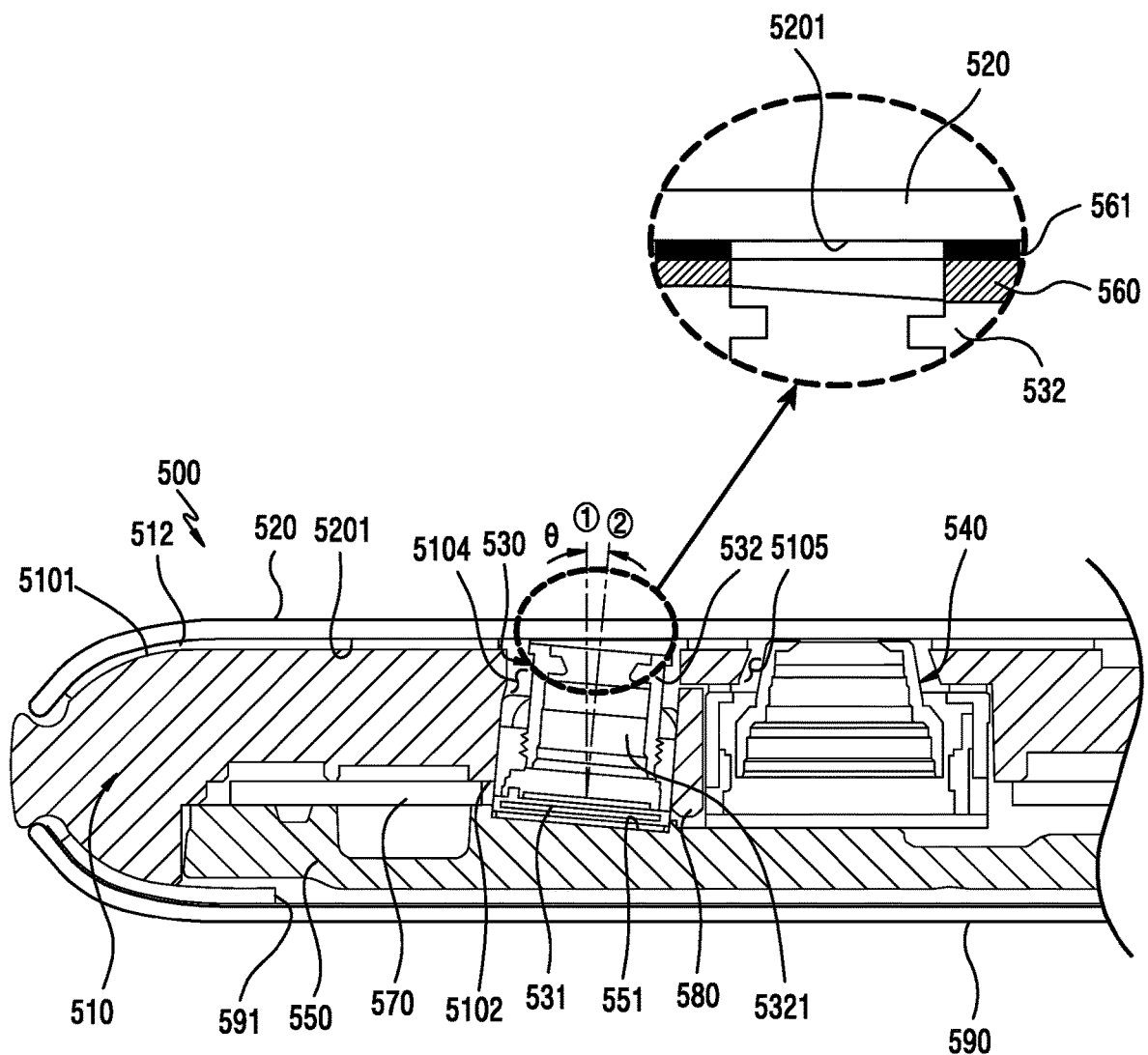
FIG. 5C is a cross-sectional view taken along the line X-X' of FIG. 5B, according to an embodiment.

Referring to FIGS. 5A, 5B and 5C, an electronic device 500 may include a first support member 510 to which a front plate 520 is disposed. The first support member 510 may include at least one through-hole 5104 or 5105 disposed to up to a second side 5102 of the first support member 510 facing in a direction opposite to a first side 5101 of the first support member 510 when the front plate 520 is viewed from above. The through-hole 5104 may be used for accommodating at least part of an imaging sensor assembly 530 and the through-hole 5105 may be used for accommodating at least part of a camera 540.

The imaging sensor assembly 530 may include a barrel 532 disposed at least partially within the through-hole 5104, a plurality of lenses 5321 disposed within the barrel 532, and a sensor housing 531 disposed to laterally surround at least part of an outer surface of the barrel 532. The sensor housing 531 may include an image sensor disposed in a direction of the plurality of lenses 5321. The sensor housing 531 may be electrically coupled to an image sensor installed to an internal printed circuit board, and may include an (FPCB 533 that extends to the outside of the sensor housing 531, and a connector 534 disposed at an end portion of the FPCB 533. The connector 534 may be used to electrically couple the imaging sensor assembly 530 to a printed circuit board 570 disposed inside the electronic device 500.

The imaging sensor assembly 530 may be tilted towards a center of the electronic device 500 due to the through-hole 5104 constructed in the first support member 510 and a support structure of the rear plate 590 or the second support member 550. The imaging sensor assembly 530 may have an inclined portion with respect to a rear side 5201 of the front plate 520 due to the tilting structure, and a tilting cap 560 (e.g., an inclination gap compensation member) may be disposed to compensate for an inclination gap caused by the inclination portion. The tilting cap 560 may be attached to or engaged with an upper side of the barrel. The tilting cap 560 may be constructed in an asymmetrical cylindrical shape at one end such that a height is lowered towards the other end facing the one end. However, the tilting cap 560 may be constructed integrally with the barrel 532 when the barrel 532 is constructed.

A sealant 561 may be disposed between the tilting cap 560 and the rear side 5201 of the front plate 520. The sealant 561 may perform a buffering operation or form a seal to prevent external foreign matter entering the inside of the electronic device 500 and to protect the imaging sensor assembly 530 from external impact. The sealant 561 may be constructed of a urethane foam (e.g., poron) or other suitable material.

Figure 5D:
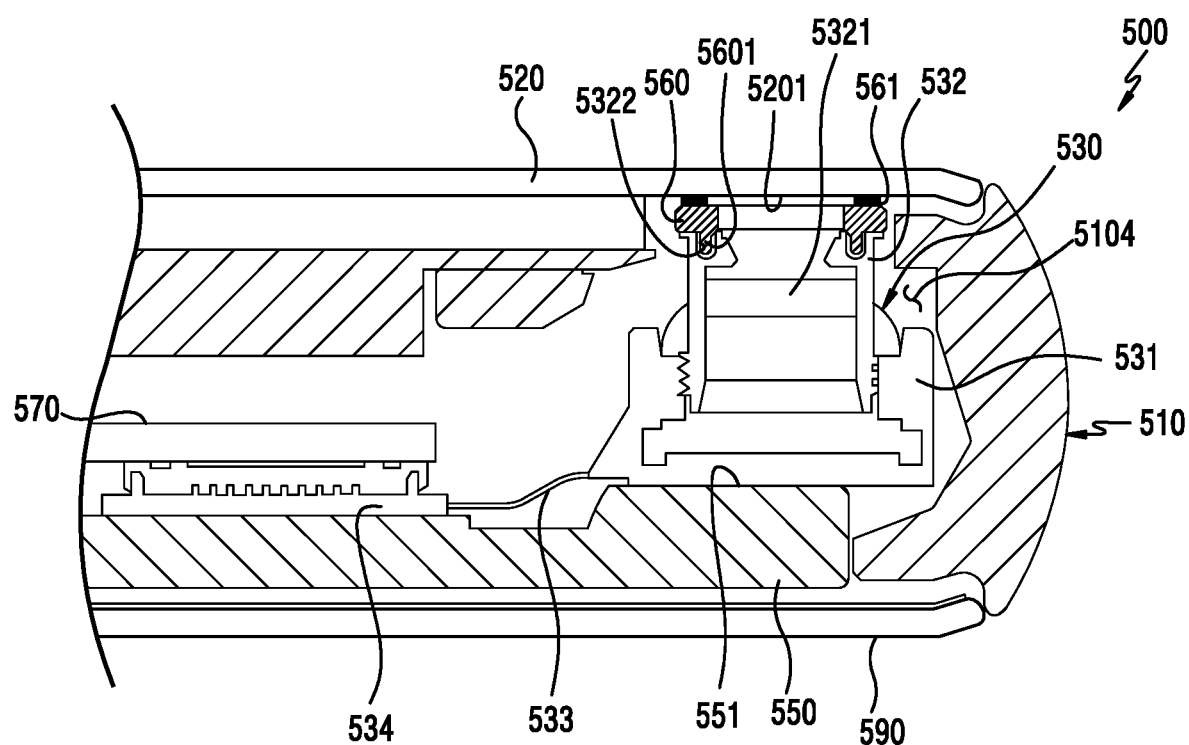
FIG. 5D is a cross-sectional view taken along the line Y-Y' of FIG. 5B, according to an embodiment.
Figure 5E:
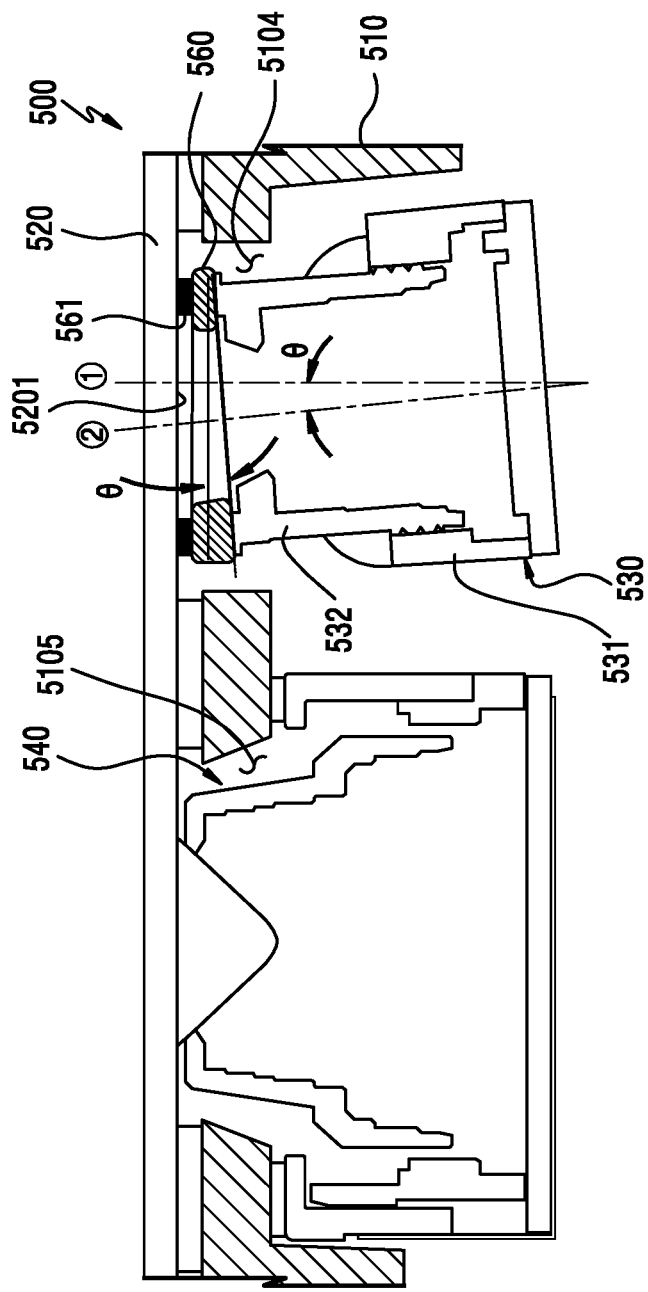
FIG. 5E is a cross-sectional view of a tilting structure of an imaging sensor assembly, according to an embodiment.

FIG. 5C is a cross-sectional view taken along the line X-X' of FIG. 5B, according to an embodiment. FIG. 5D is a cross-sectional view taken along the line Y-Y' of FIG. 5B, according to an embodiment. FIG. 5E is a cross-sectional view of a tilting structure of an imaging sensor assembly, according to an embodiment.

Referring to FIGS. 5C-5E, the electronic device 500 may include the first support member 510, the front plate 520 attached through a seal member 521 (e.g., a waterproof member, an adhesive member, or a tape member) to the first side 5101 facing in a direction ① of FIG. 5C of the first support member 510, a second support member 550 disposed in a direction facing the first side 5101 of the first support member 510, and a rear plate 590 attached through a seal member 591 (e.g., a waterproof member, an adhesive member, or a tape member) to a rear side of the second support member 550. The first support member 510 may include the through-hole 5104 disposed from the first side 5101 of the first support member 510 to the second side 5102. The first support member 510 may include another through-hole 5105 disposed with a spacer 580 provided therebetween to accommodate the camera 540 around the through-hole 5104. The another through-hole 5105 may accommodate the camera 540.

The imaging sensor assembly 530 may be disposed such that at least some regions are inserted into the through-hole 5104 disposed from the first side 5101 of the first support member 510 to the second side 5102. In the imaging sensor assembly 530, the barrel 532 including the tilting cap 560 and the sealant 561 and/or at least part of the sensor housing 531 may be inserted into the through-hole 5104. The through-hole 5104 may be constructed such that an inner side thereof is inclined to allow the imaging sensor assembly 530 to face in the direction ② of FIG. 5C having an acute angle with respect to a first direction (e.g., the direction ① of FIG. 5C. A tilting angle θ of the imaging sensor assembly 530 may be defined only with an operation in which at least part thereof is inserted into the through-hole 5104. However, the through-hole 5104 may be constructed not to be inclined in a direction parallel to the direction ① of FIG. 5C. The through-hole 5104 may be constructed such that the imaging sensor assembly 530 has a width that can be inclined with the tilting angle θ in the through-hole 5104.

The tilting cap 560 may be disposed between the imaging sensor assembly 530 and the rear side 5201 of the front plate 520 to compensate for an inclined portion constructed by the tilting angle θ. The tilting cap 560 may be constructed in an asymmetrical cylindrical shape at one end such that a height is lowered towards the other end facing the one end. The sealant 561 may be disposed between the tilting cap 560 and the front plate 520 to prevent foreign matter from entering into the imaging sensor assembly 530. The tilting cap 560 may be configured separately or constructed integrally with the barrel 531 at an upper portion of the barrel 532. The tilting cap 560 and the sealant 561 may be attached to the barrel 532 and the rear side 5201 of the front plate 520 using a double-sided tape.

The tilting cap 560 may be fixed to an upper side of the barrel 532 of the imaging sensor assembly 530. Since the tilting cap 560 has an asymmetric cylindrical structure, i.e., having a different height, a guide structure may be fixed to the cylindrical barrel 532. The guide structure may include at least one guide groove 5322 disposed to an upper side of the barrel 532 and a guide protrusion 5601 inserted into the guide groove 5322 at a lower side of the tilting cap 560. The tilting cap 560 may be fixed to the upper side of the barrel 532 by inserting the guide protrusion 5601 into the guide groove 5322.

The imaging sensor assembly 530 in which the tilting cap 560 and the sealant 561 are stacked on the upper side of the barrel 532 may be inserted to be in contact with the front plate 520 through the through-hole 5104. The imaging sensor assembly 530 may be disposed to have the tilting angle θ due to an inclination structure of the through-hole 5104. The imaging sensor assembly 530 may be disposed such that the sealant 561 stacked on an upper portion of the tilting cap 560 is in contact with the rear side 5201 of the front plate 520. The imaging sensor assembly 530 at least partially inserted into the through-hole 5104 may be electrically coupled to a printed circuit board 570 disposed in a space between the first support member 510 and the second support member 550 using the FPCB 533 and the connector 534.

The second support member 550 may be disposed at least partially in contact with the second side 5102 of the first support member 510. At least some regions 551 of the second support member 550 may support at least part of the imaging sensor assembly 530. The region 551 of the second support member 550 may be constructed to have a specific inclination angle to support a lower side of the sensor housing 531 of the imaging sensor assembly 530 inserted into the through-hole 5104. The inclination angle may be equal to the tilting angle θ. The second support member 550 may be fixed to the first support member 510 through bonding, screw fastening, or mechanical assembling.

The imaging sensor assembly 530 does not include a bracket, but may have a tilting structure due to a self-structure of the first support member 510 and a support structure of the second support member 550, thereby decreasing a size of the electronic device 500 and preventing an expansion of a BM region.

Figure 6A:
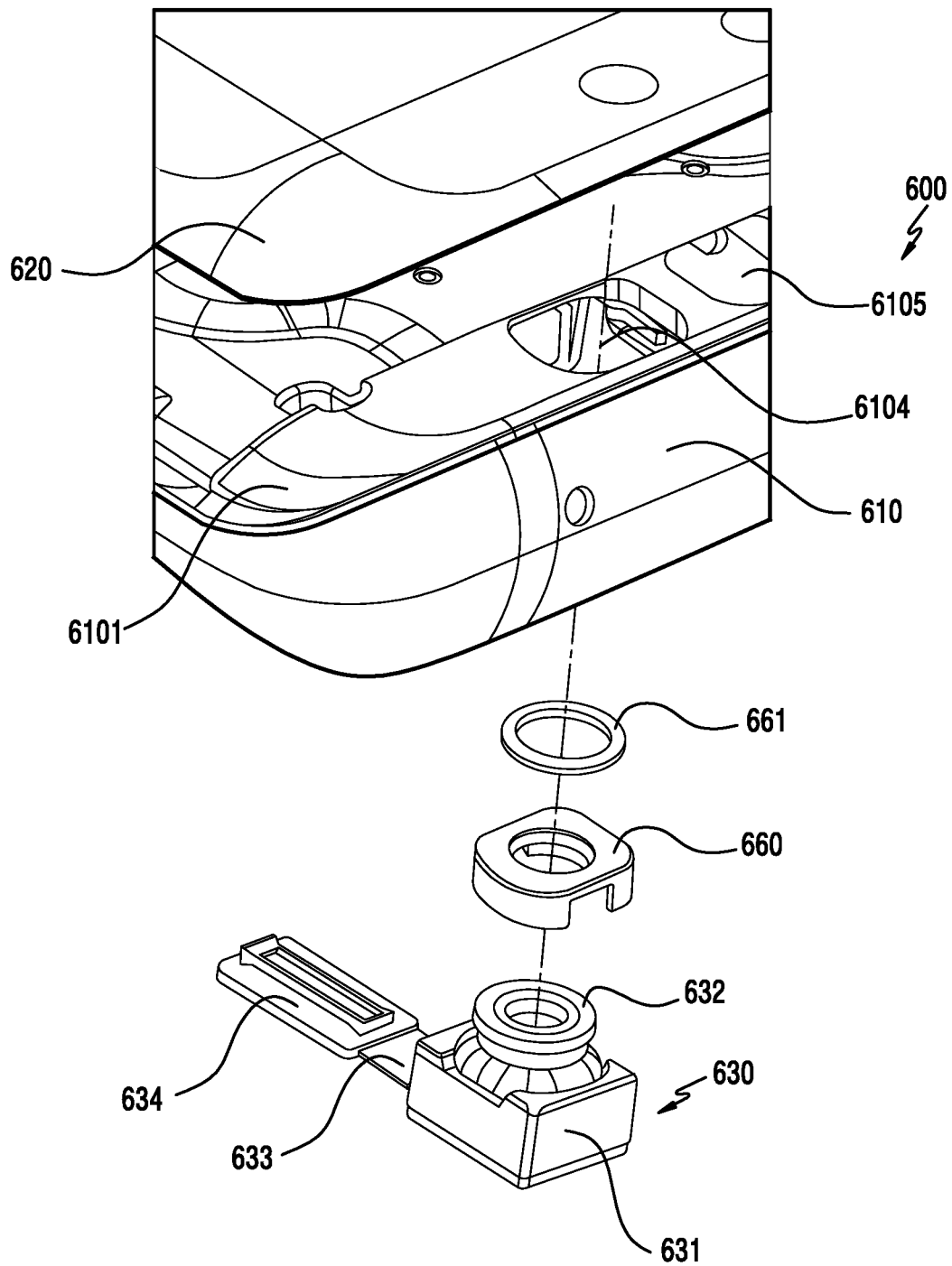
FIG. 6A is an exploded perspective view of an imaging sensor assembly, according to an embodiment.
Figure 6B:
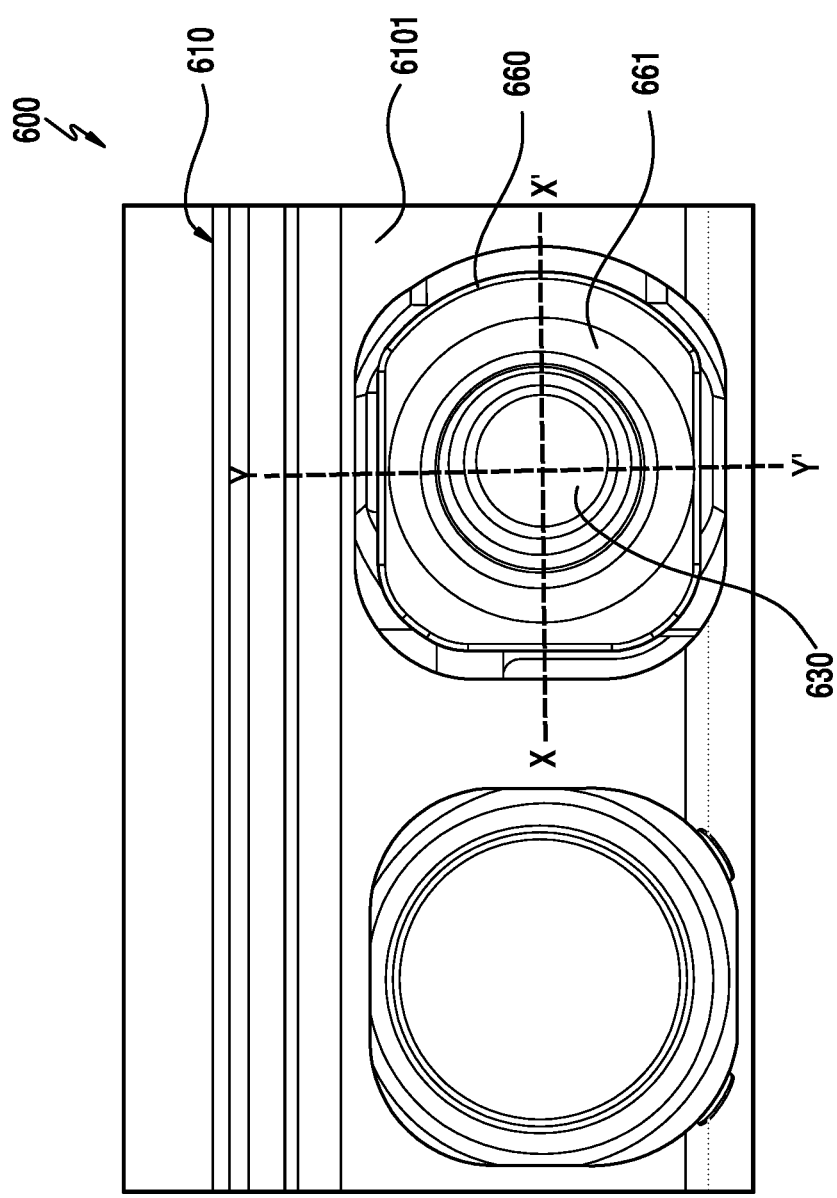
FIG. 6B is a diagram of an imaging sensor assembly that is mounted to a housing, according to an embodiment.

FIG. 6A is an exploded perspective view of an imaging sensor assembly, according to an embodiment FIG. 6B is a diagram of an imaging sensor assembly that is mounted to a housing, according to an embodiment.

Figure 6C:
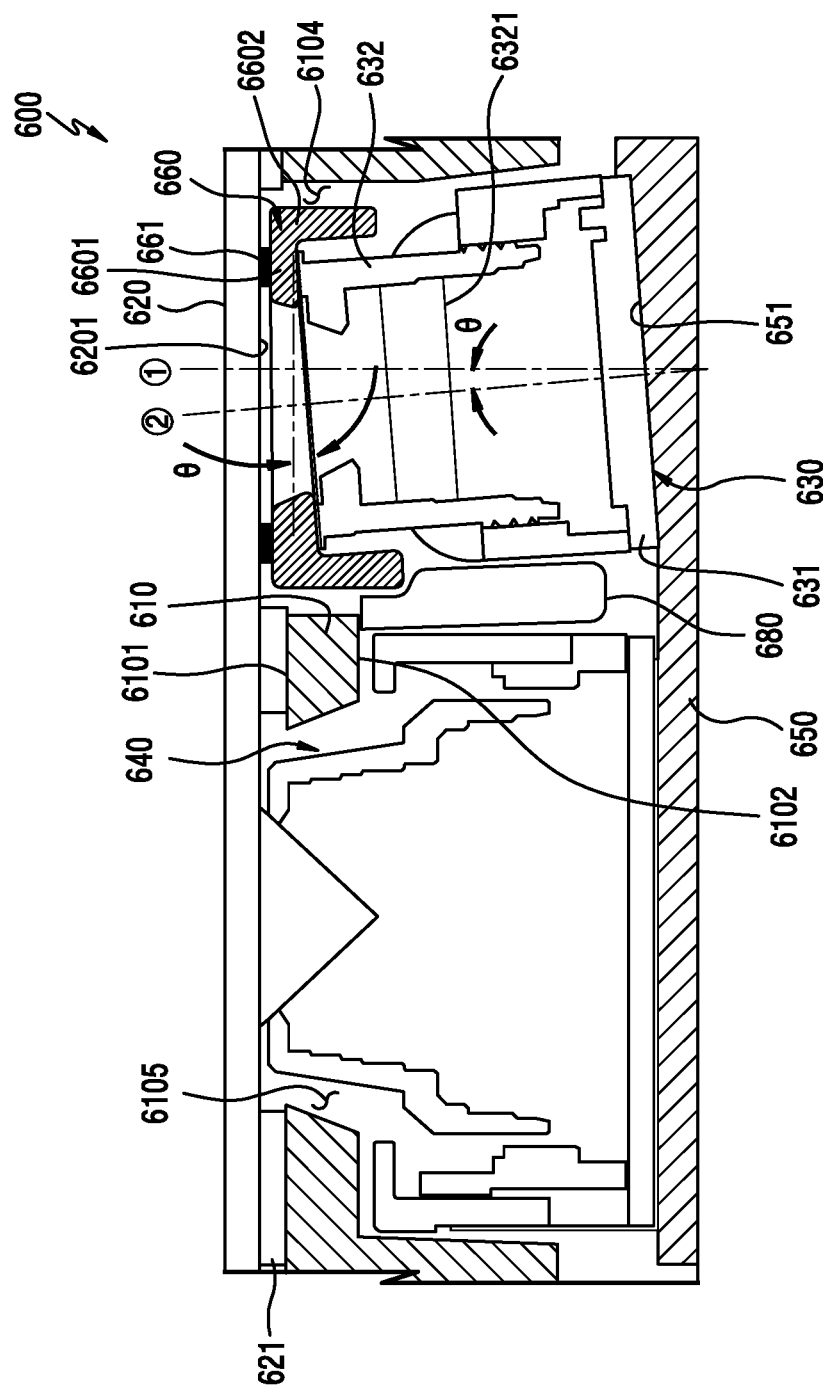
FIG. 6C is a cross-sectional view taken along the line X-X' of FIG. 6B, according to an embodiment.

Referring to FIGS. 6A, 6B and 6C, an electronic device 600 may include a first support member 610 to which a front plate 620 is disposed. The first support member 610 may include at least one through-hole 6104 or 6105 that extends to a second side 6102 of the first support member 610 facing in a direction opposite to a first side 6101 of the first support member 610 when the front plate 620 is viewed from above. The through-hole may be used for accommodating at least part of an imaging sensor assembly 630 and the through-hole 6105 may be used for accommodating at least part of a camera (e.g., a camera 640).

The imaging sensor assembly 630 may include a barrel 632 disposed at least partially within the through-hole 6104, a plurality of lenses 6321 disposed within the barrel 632, and a sensor housing 631 that surrounds at least part of an outer surface of the barrel 632. The sensor housing 631 may include an image sensor disposed in a direction of the plurality of lenses 6321. The sensor housing 631 may be electrically coupled to an image sensor installed to an internal printed circuit board, and may include an FPCB 633 on the outside of the sensor housing 631, and a connector 634 disposed at an end portion of the FPCB 633. The connector 634 may be used to electrically couple the imaging sensor assembly 630 to a printed circuit board 670 of FIG. 6D disposed inside the electronic device 600.

The imaging sensor assembly 630 may be tilted towards a center of the electronic device 600 due to a self-structure of the through-hole 6104 constructed in the first support member 610 and a support structure of a second support member 650. The imaging sensor assembly 630 may have an inclined portion with respect to a rear side 6201 of the front plate 620 due to the tilting structure, and a tilting cap 660 (e.g., an inclination gap compensation member) may be disposed to compensate for an inclination gap caused by the inclination portion. The tilting cover 660 may include an upper side 6601 in contact with an upper side of the barrel 632 and a lateral side 6602 surrounding at least part of a boundary of the upper side 6601 and extended to have a specific height. The tilting cover 660 may be disposed to partially cover an upper portion of the barrel 632 by the upper side 6601 and the lateral side 6602.

A sealant 661 may be disposed between the tilting cap 660 and the rear side 6201 of the front plate 620. The sealant 661 may perform a buffering operation or form a seal to prevent foreign matter from entering into the electronic device 600 and to protect the imaging sensor assembly 630 from external impact. The sealant 661 may be constructed of a urethane foam (e.g., poron).

Figure 6D:
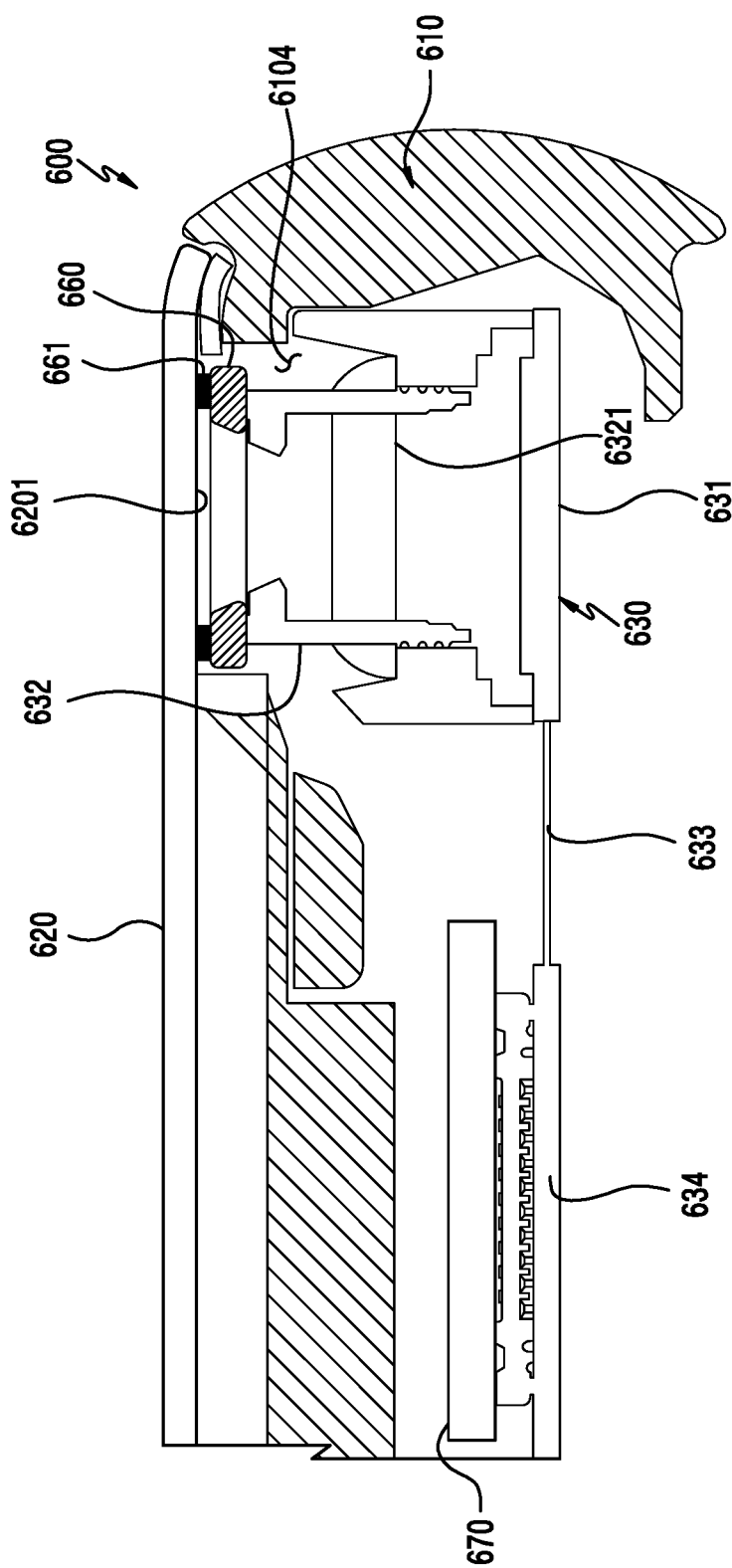
FIG. 6D is a cross-sectional view taken along the line Y-Y' of FIG. 6B, according to an embodiment.

FIG. 6C is a cross-sectional view taken along the line X-X' of FIG. 6B, according to an embodiment. FIG. 6D is a cross-sectional view taken along the line Y-Y' of FIG. 6B, according to an embodiment.

Referring to FIG. 6C and FIG. 6D, the electronic device 600 may include the first support member 610, the front plate 620 attached through a seal member 621 (e.g., a waterproof member, an adhesive member, or a tape member) to a first side 6101 facing in a direction ① of FIG. 6C of the first support member 610, and the second support member 650 disposed in a direction facing the first side 6101 of the first support member 610. Although not shown, the electronic device 600 may further include a rear plate attached through a seal member 621 to a rear side of the second support member 650. The first support member 610 may include the through-hole 6104 disposed from the first side 6101 of the first support member 610 to the second side 6102. The first support member 610 may include another through-hole 6105 disposed with a spacer 680 provided therebetween to accommodate the camera 640 around the through-hole 6104.

The imaging sensor assembly 630 may be disposed such that at least some regions are inserted into the through-hole 6104 disposed from the first side 6101 of the first support member 610 to the second side 6102. In the imaging sensor assembly 630, the barrel 632 including the tilting cap 660 and the sealant 661 and/or at least part of the sensor housing 631 may be inserted into the through-hole 6104. The through-hole 6104 may be constructed such that an inner side thereof is inclined to allow the imaging sensor assembly 630 to face in the direction ② of FIG. 6C having an acute angle with respect to the direction ① of FIG. 6C. A tilting angle θ of the imaging sensor assembly 630 may be defined only with an operation in which at least part thereof is inserted into the through-hole 6104.

The tilting cap 660 may be disposed between the imaging sensor assembly 630 and the rear side 6201 of the front plate 620 to compensate for an inclined portion constructed by the tilting angle θ. An upper side of the tilting cover 660 may be constructed to have a different thickness for each region. The upper side 6601 of the tilting cover 660 may be constructed in an asymmetrical shape at one end such that a height is lowered towards the other end facing the one end. The tilting cover 660 surrounds at least part of an upper side of the barrel 632 of the imaging sensor assembly 630. The tilting cover 660 may be constructed to have a size not greater than a diameter of the sensor housing 631, even if it is mounted to the barrel 632. The sealant 661 may be disposed between the tilting cap 660 and the front plate 620 to prevent foreign matter from entering into the imaging sensor assembly 630. The tilting cap 660 and the sealant 661 may be attached to the barrel 632 and the rear side 6201 of the front plate 620 by using double-sided tape. The tilting cover 660 may also have a guide structure in which the aforementioned guide groove and guide protrusion are included to be in contact with the barrel 632.

The imaging sensor assembly 630 in which the tilting cap 660 and the sealant 661 are stacked on the upper side of the barrel 632 may be inserted to be in contact with the front plate 620 through the through-hole 6104. The imaging sensor assembly 630 may have the tilting angle θ due to an inclination structure of the through-hole 6104. The imaging sensor assembly 630 may be disposed such that the sealant 661 stacked on an upper portion of the tilting cap 660 is in contact with the rear side 6201 of the front plate 620. The imaging sensor assembly 630 at least partially inserted into the through-hole 6104 may be electrically coupled to a printed circuit board 670 disposed within a space between the first support member 610 and the second support member 650 by using the FPCB 633 and the connector 634.

The rear plate 650 may be at least partially in contact with the second side 6102 of the first support member 610, and at least some regions 651 may support at least part of the imaging sensor assembly 630. The region 651 may have a specific inclination angle to support a lower side of the sensor housing 631 of the imaging sensor assembly 630 inserted into the through-hole 6104, having the tilting angle θ. The inclination angle may be equal to the tilting angle θ.

The second support member 650 may be fixed to the first support member 610 through bonding, screw fastening, or mechanical assembling, and may support the sensor housing 631.

Figure 7A:
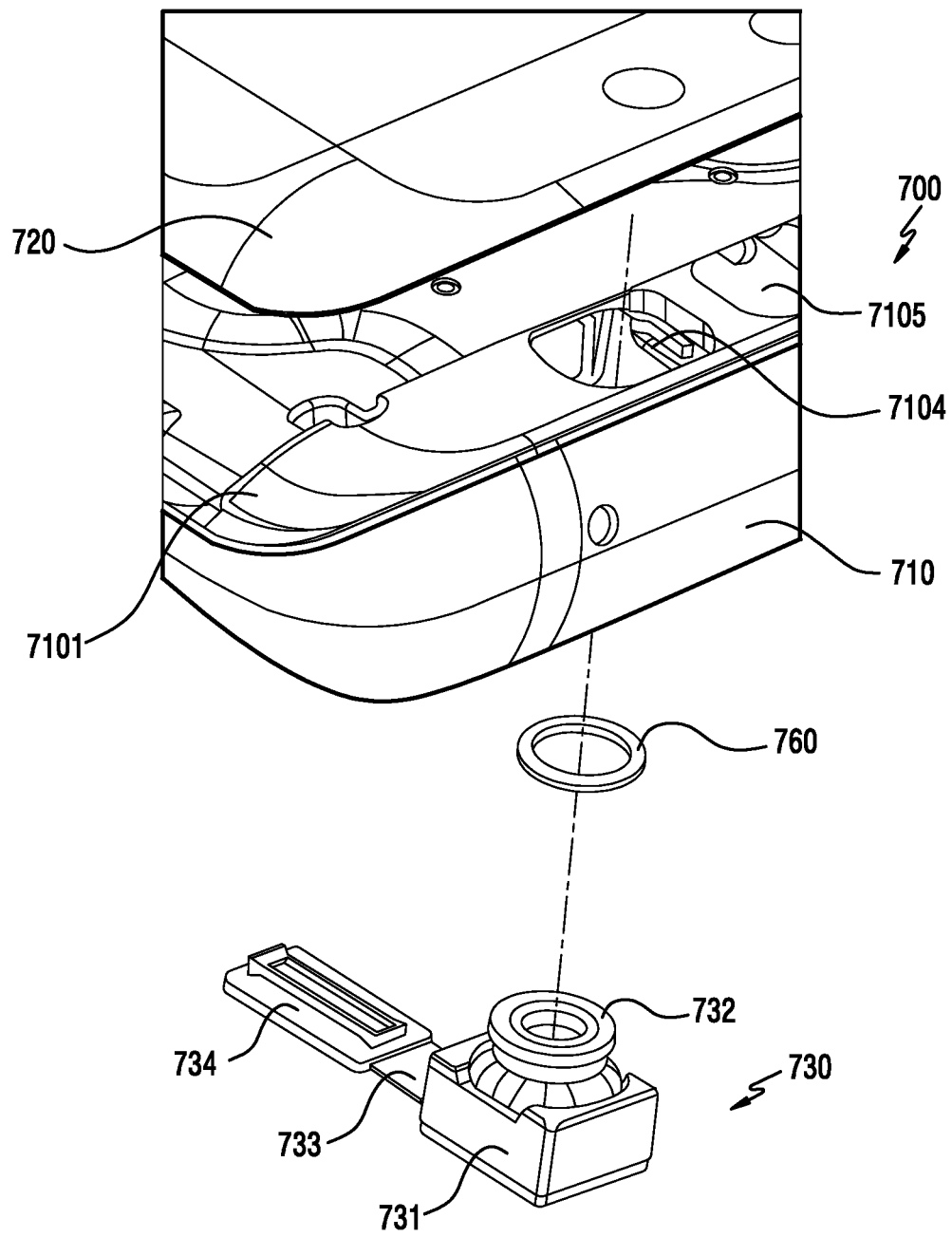
FIG. 7A is an exploded perspective view of an imaging sensor assembly, according to an embodiment.
Figure 7B:
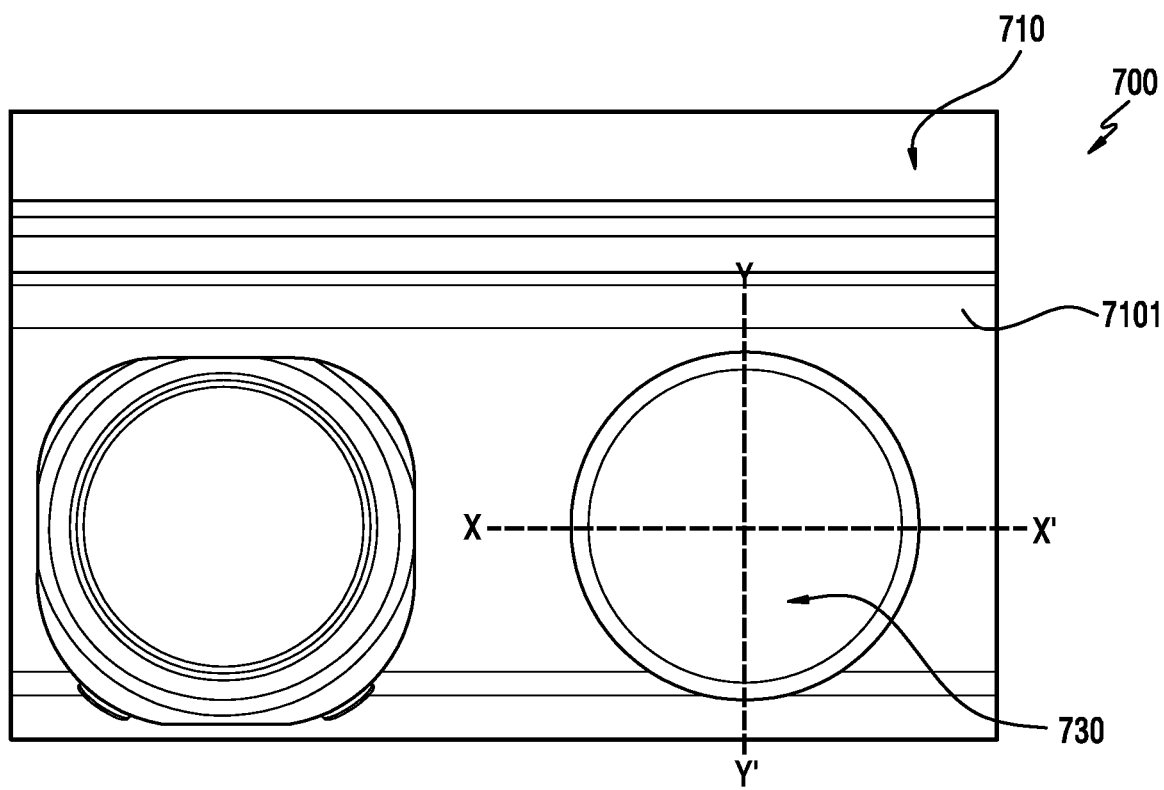
FIG. 7B is a diagram of an imaging sensor assembly that is mounted to a housing, according to an embodiment.

FIG. 7A is an exploded perspective view of an imaging sensor assembly, according to an embodiment. FIG. 7B is a diagram of an imaging sensor assembly that is mounted to a housing, according to an embodiment.

Figure 7C:
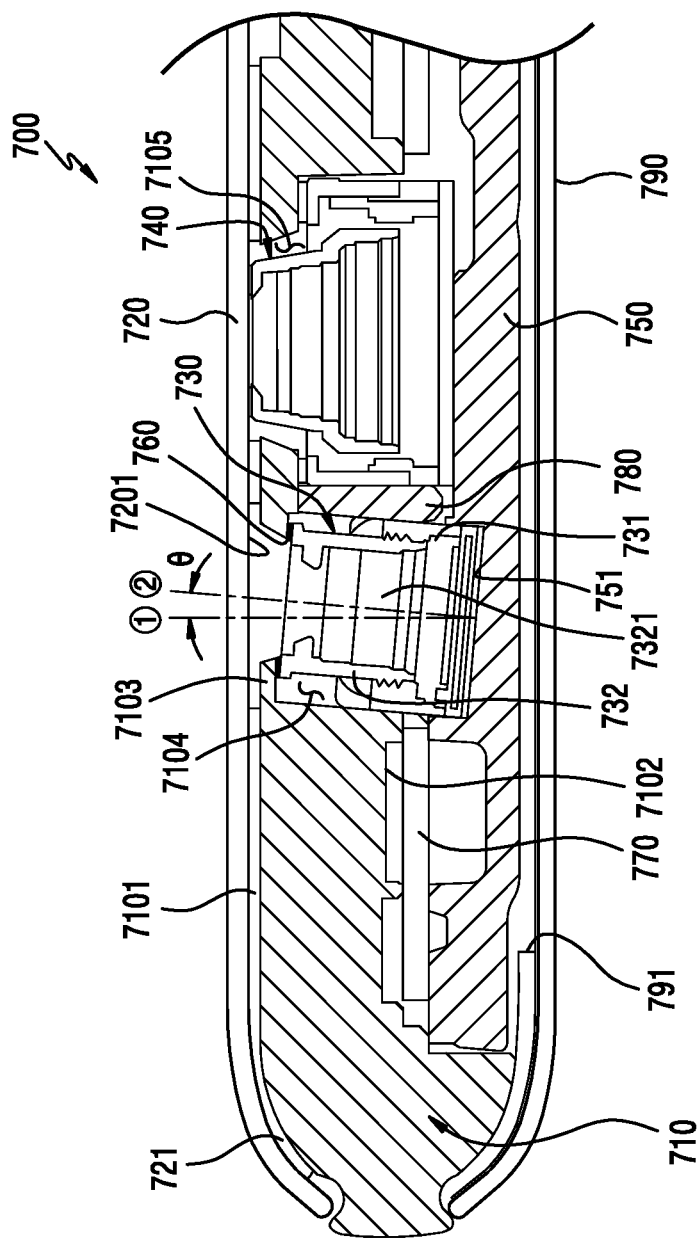
FIG. 7C is a cross-sectional view taken along the line X-X' of FIG. 7B, according to an embodiment.

Referring to FIGS. 7A, 7B and 7C, an electronic device 700 may include a first support member 710 to which a front plate 720 is disposed. The first support member 710 may include at least one through-hole 7104 or 7105 that extends to a second side 7102 of the first support member 710 facing in a direction opposite to a first side 7101 of the first support member 710 when the front plate 720 is viewed from above. The through-hole 7104 may be used for accommodating at least part of an imaging sensor assembly 730 and the through-hole 7105 may be used for accommodating at least part of a camera (e.g., a camera 740).

The imaging sensor assembly 730 may include a barrel 732 disposed at least partially within the through-hole 7104, a plurality of lenses 7321 disposed within the barrel 732, and a sensor housing 731 that surrounds at least part of an outer surface of the barrel 732. The sensor housing 731 may include an image sensor disposed in a direction of the plurality of lenses 7321. The sensor housing 731 may be electrically coupled to an image sensor installed to an internal printed circuit board, and may include an FPCB 733 that extends to the outside of the sensor housing 731, and a connector 734 disposed at an end portion of the FPCB 733. The connector 734 may be used to electrically couple the imaging sensor assembly 730 to a printed circuit board 770 disposed inside the electronic device 700.

The imaging sensor assembly 730 may be tilted towards a center of the electronic device 700 due to a self-structure of the through-hole 7104 constructed in the first support member 710 and a support structure of a second support member 750. An upper portion of the barrel 732 may extend to a stopper 7103 of the housing 710 extended into the through-hole 7104.

A sealant 760 may be disposed between the stopper 7103 of the housing 710 and the barrel 732. The sealant 760 may perform a buffering operation or form a seal to prevent foreign matter from entering into the electronic device 700 and to protect the imaging sensor assembly 730 from external impact. The sealant 760 may be constructed of a urethane foam (e.g., poron).

Figure 7D:
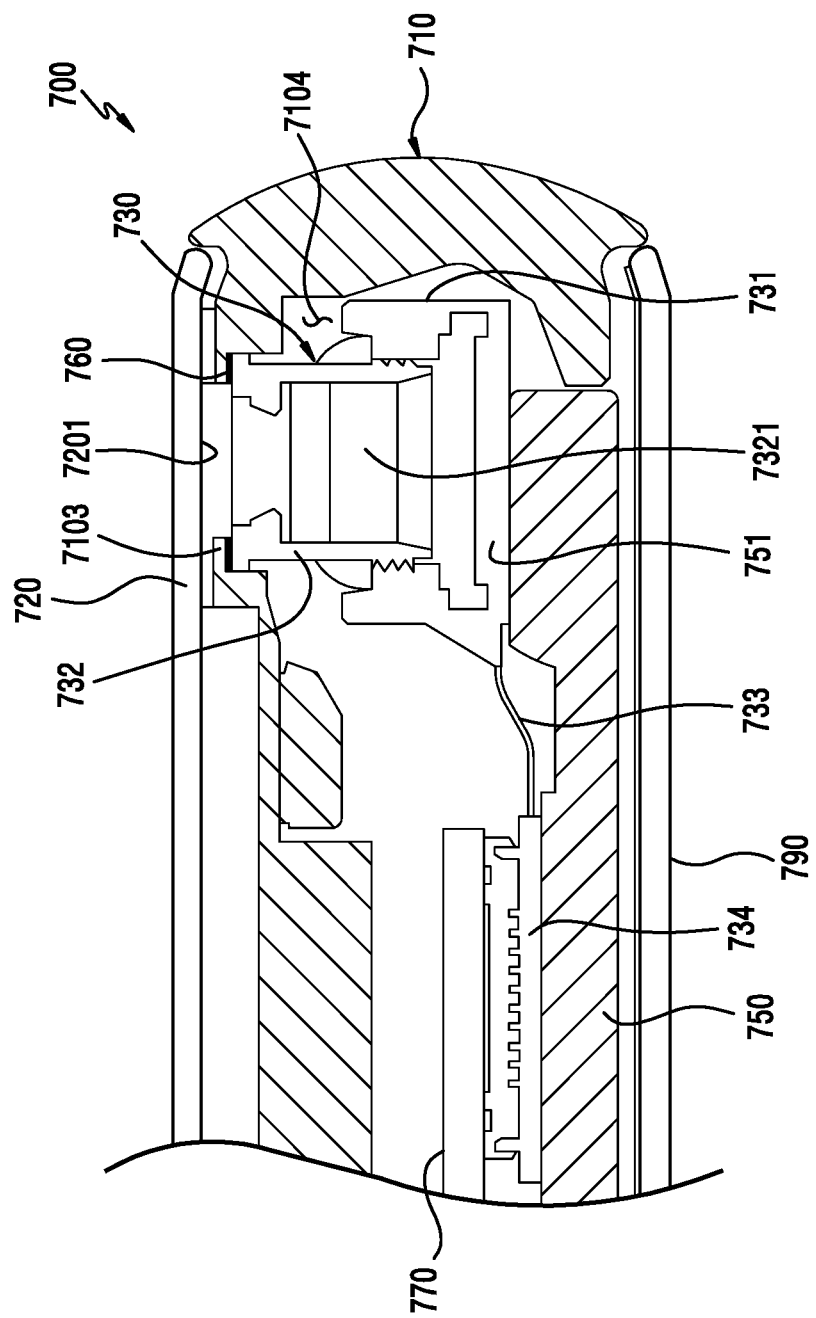
FIG. 7D is a cross-sectional view taken along the line Y-Y' of FIG. 7B, according to an embodiment.

FIG. 7C is a cross-sectional view taken along the line X-X' of FIG. 7B, according to an embodiment. FIG. 7D is a cross-sectional view taken along the line Y-Y' of FIG. 7B, according to an embodiment.

Referring to FIG. 7C and FIG. 7D, the electronic device 700 may include the first support member 710, the front plate 720 attached through a seal member 721 (e.g., a waterproof member, an adhesive member, or a tape member) to the first side 7101 facing in a direction ① of FIG. 7C of the first support member 710, and the second support member 750 disposed in a direction facing the first side 7101 of the first support member 710. The electronic device 700 may include a rear plate 790 attached through a seal member 791 to a rear side 7201 of the second support member 750. The first support member 710 may include the through-hole 7104 disposed from the first side 7101 of the first support member 710 to the second side 7102. The first support member 710 may include another through-hole 7105 disposed with a spacer 780 provided therebetween to accommodate the camera 740 around the through-hole 7104.

The imaging sensor assembly 730 may be disposed such that at least some regions are inserted into the through-hole 7104 disposed from the first side 7101 of the first support member 710 to the second side 7102. The first support member 710 may include the stopper 7103 extending from the first side 7101 in a direction of the through-hole 7104. The imaging sensor assembly 730 may be disposed such that at least part of the barrel 732 extends up to the stopper 7103. The stopper may be constructed to have a different thickness to tilt the imaging sensor assembly with a tilting angle θ. The through-hole 7104 may be constructed such that an inner side thereof is inclined to allow the imaging sensor assembly 730 to face in the direction ② of FIG. 7C having an acute angle with respect to the direction ① of FIG. 7C. A tilting angle θ of the imaging sensor assembly 730 may be defined only when at least part of the imaging sensor assembly 730 is inserted into the through-hole 7104.

The sealant 760 may be disposed between the stopper 7103 of the first support member 710 and the barrel 732 to prevent foreign matter from entering into the imaging sensor assembly 730. The barrel 732 and the sealant 760 may be attached to the stopper 7103 of the first support member 710 by using double-sided tape.

The imaging sensor assembly 730 at least partially inserted into the through-hole 7104 may be electrically coupled to the printed circuit board 770 disposed into a space between the first support member 710 and the second support member 750 by using the FPCB 733 and the connector 734.

The second support member 750 may be at least partially in contact with the second side 7102 of the first support member 710, and at least some regions 751 may support at least part of the imaging sensor assembly 730. The region 751 of the second support member 750 may be inserted into the through-hole 7104 with the tilting angle θ, and may be constructed with a specific inclination angle to support a lower side of the sensor housing 731 of the imaging sensor assembly 730 disposed such that the barrel 732 extends up to the stopper 7103. The inclination angle may be equal to the tilting angle θ. The second support member 750 may be fixed to the second support member 710 through bonding, screw fastening, or mechanical assembling, and may support the sensor housing 731.

Figure 8A:
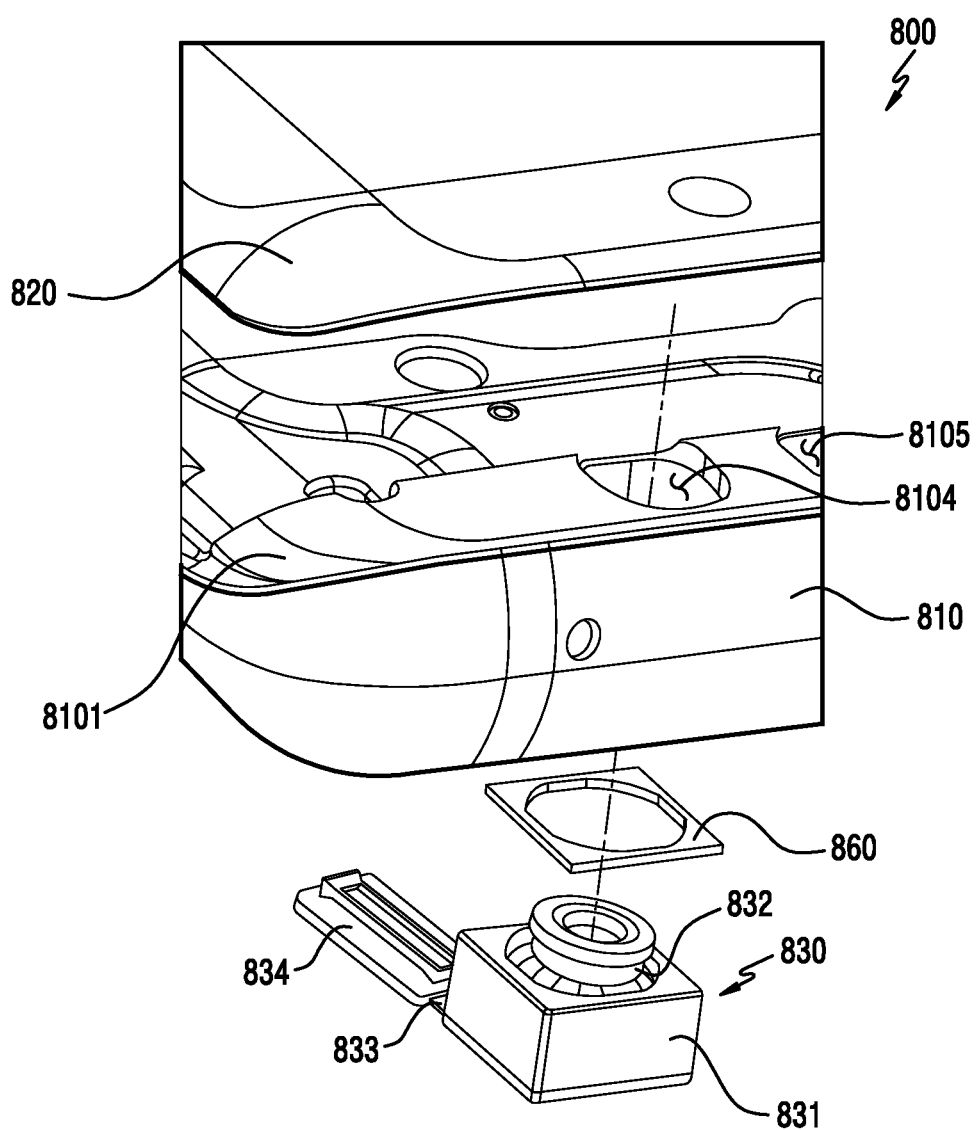
FIG. 8A is an exploded perspective view of an imaging sensor assembly, according to an embodiment.
Figure 8B:
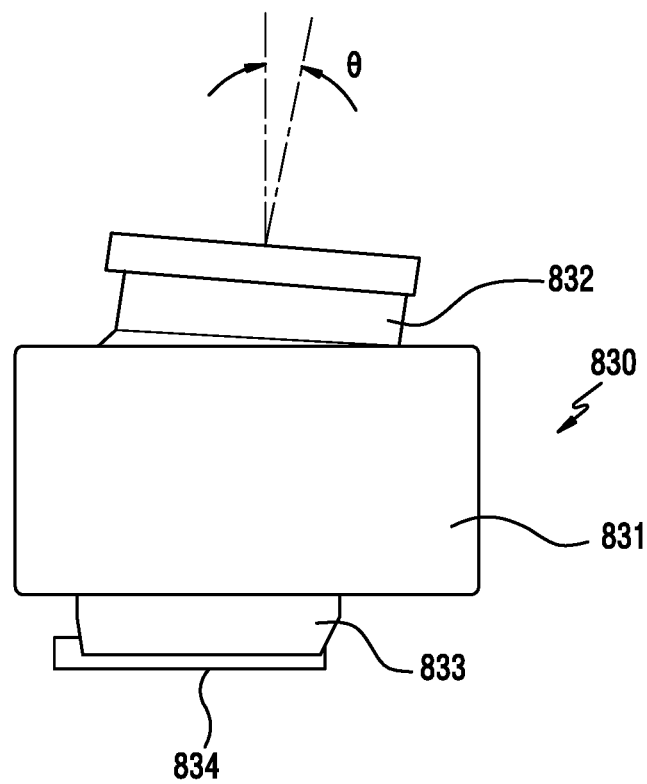
FIG. 8B is a perspective view of an imaging sensor assembly, according to an embodiment.
Figure 8C:
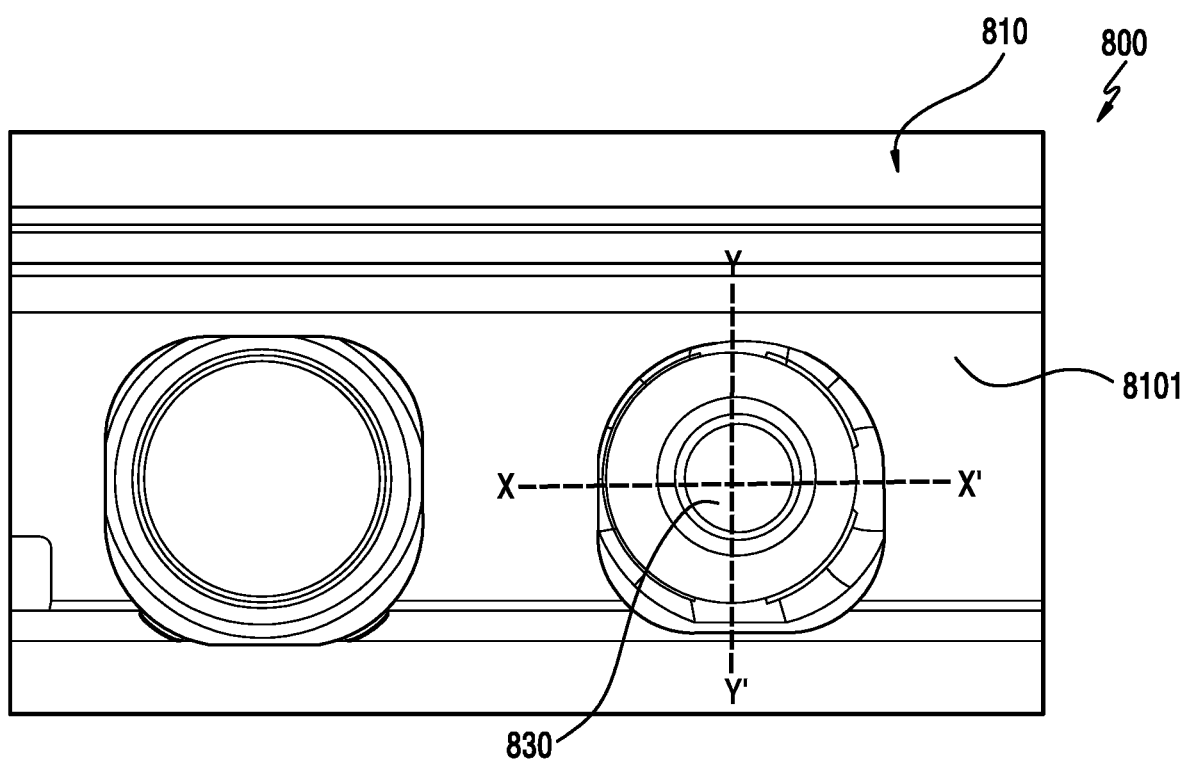
FIG. 8C is a diagram of an imaging sensor assembly that is mounted to a housing, according to an embodiment.

FIG. 8A is an exploded perspective view of an imaging sensor assembly, according to an embodiment. FIG. 8B is a perspective view of an imaging sensor assembly, according to an embodiment. FIG. 8C is a diagram of an imaging sensor assembly that is mounted to a housing, according to an embodiment.

Referring to FIGS. 8A, 8B, 8C and 8D, an electronic device 800 may include a first support member 810 to which a front plate 820 is disposed. The first support member 810 may include at least one through-hole 8104 or 8105 that extends up to a second side 8102 of the first support member 810 facing in a direction opposite to a first side 8101 of the first support member 810 when the front plate 820 is viewed from above. The through-hole 8104 may be used for accommodating at least part of an imaging sensor assembly 830 and the through-hole 8105 may be used for accommodating at least part of a camera 840.

The imaging sensor assembly 830 may include a barrel 832 disposed at least partially within the through-hole 8104, a plurality of lenses 8321 disposed within the barrel 832, and a sensor housing 831 that surrounds at least part of an outer surface of the barrel 832. The sensor housing 831 may include an image sensor disposed in a direction of the plurality of lenses 8321. The sensor housing 831 may be electrically coupled to an image sensor installed to an internal printed circuit board, and may include an FPCB 833 that extends to the outside of the sensor housing 831, and a connector 834 disposed at an end portion of the FPCB 833. The connector 834 may be used to electrically couple the imaging sensor assembly 830 to a PCB 870 of FIG. 8E disposed inside the electronic device 800.

The imaging sensor assembly 830 may be tilted towards a center of the electronic device 800 due to a self-tilting structure of the barrel 832 disposed to the sensor housing 810. An upper portion of the sensor housing 831 may extend up to a stopper 8103 of the first support member 810 extended into the through-hole 8104.

A sealant 860 may be disposed between the sensor housing 831 and the stopper 8103 of the first support member 810. The sealant 860 may perform a buffering operation or form a seal to prevent foreign matter from entering into the electronic device 800 and to protect the imaging sensor assembly 830 from external impact. The sealant 860 may be constructed of a urethane foam (e.g., poron).

Figure 8D:
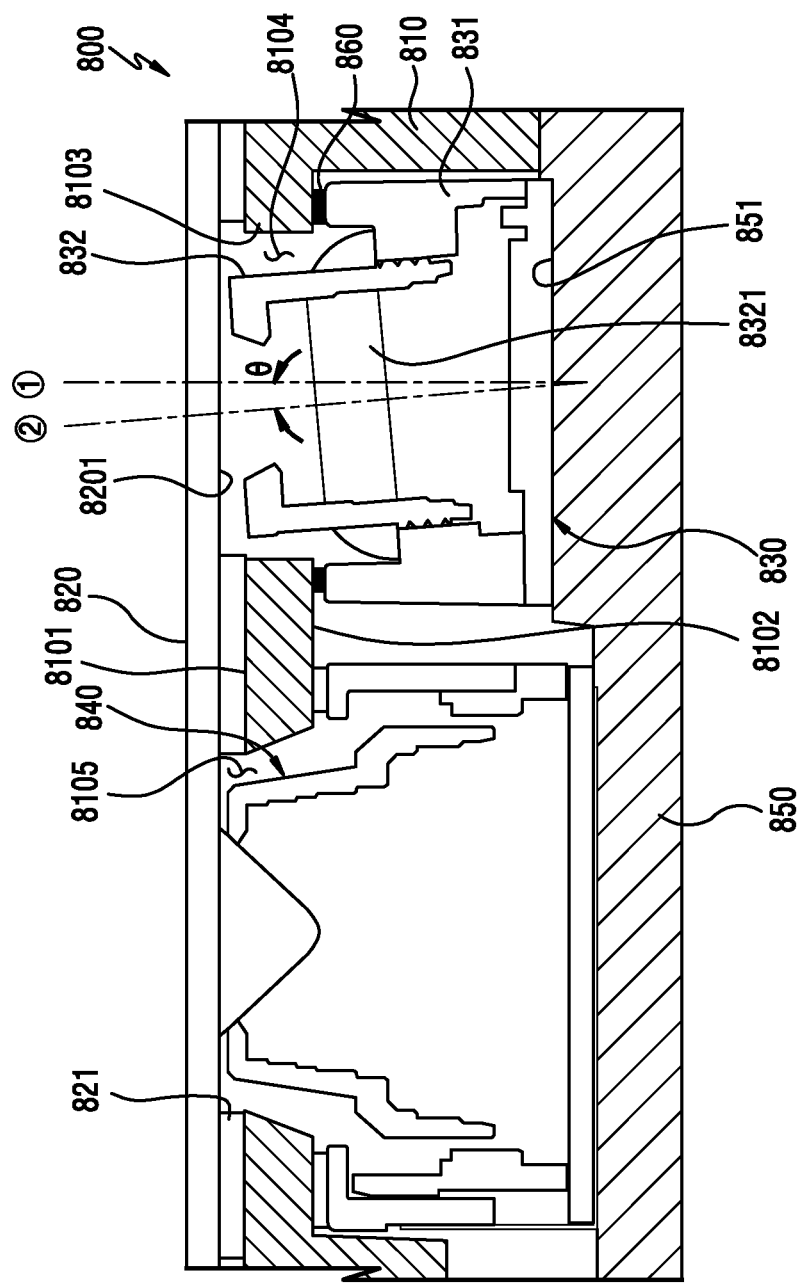
FIG. 8D is a cross-sectional view taken along the line X-X' of FIG. 8C, according to an embodiment.
Figure 8E:
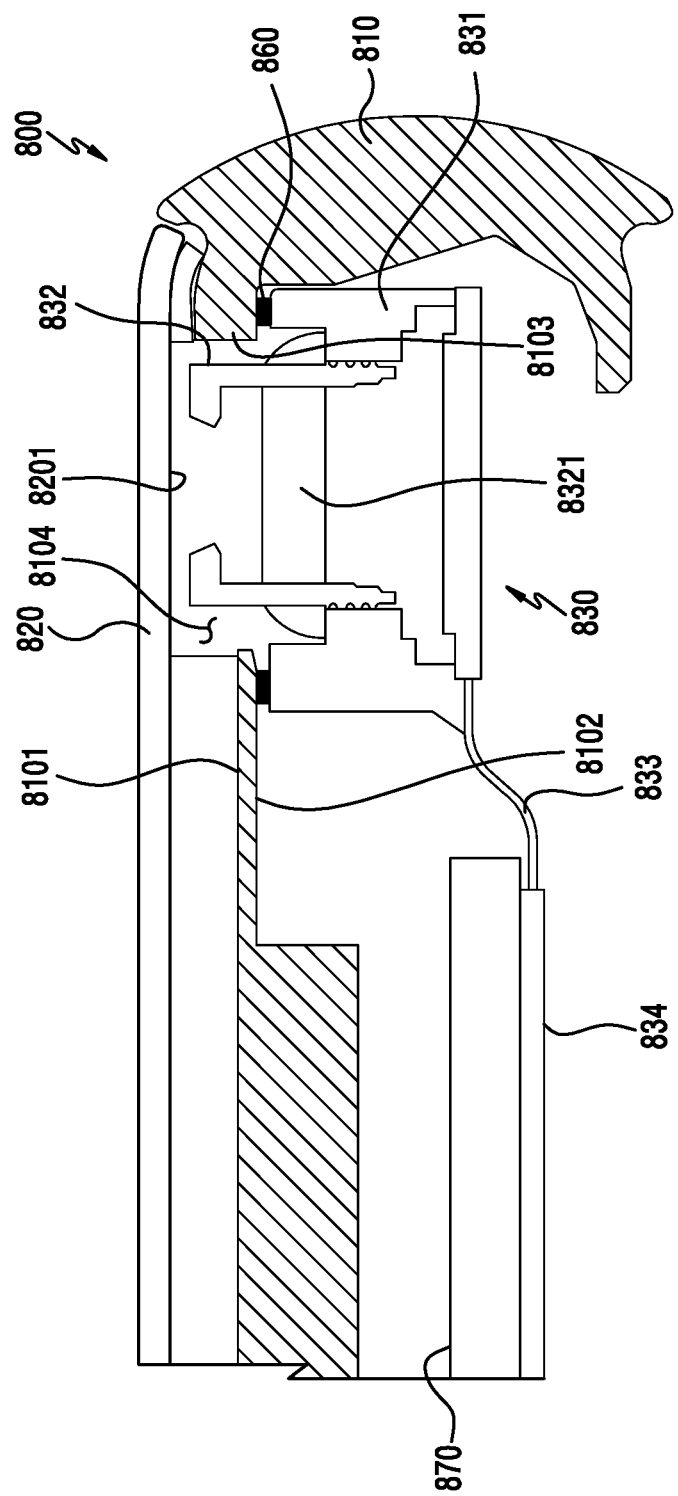
FIG. 8E is a cross-sectional view taken along the line Y-Y' of FIG. 8C, according to an embodiment.

FIG. 8D is a cross-sectional view taken along the line X-X' of FIG. 8C, according to an embodiment. FIG. 8E is a cross-sectional view taken along the line Y-Y' of FIG. 8C, according to an embodiment.

Referring to FIGS. 8D and 8E, the electronic device 800 may include the first support member 810, the front plate 820 attached through a seal member 821 (e.g., a waterproof member, an adhesive member, or a tape member) to the first side 8101 facing in a direction ① of FIG. 8D of the first support member 810, and a second support member 850 disposed in a direction facing the first side 8101 of the first support member 810. Although not shown, the electronic device 800 may further include a rear plate attached to a rear side 8201 of the first support member 850 through the seal member 821. The first support member 810 may include the through-hole 8104 disposed from the first side 8101 of the first support member 810 to the second side 8102. The first support member 810 may include another through-hole 8105 disposed with a spacer provided therebetween to accommodate the camera 840 around the through-hole 8104.

The imaging sensor assembly 830 may be disposed such that at least some regions are inserted into the through-hole 8104 disposed from the first side 8101 of the first support member 810 to the second side 8102. The first support member 810 may include the stopper 8103 that extends from the first side 8101 in a direction of the through-hole 8104. The imaging sensor assembly 830 may be disposed such that at least part of the sensor housing 832 extends up to the stopper 8103. Since the barrel 832 is inclined with a tilting angle θ at the sensor housing 831, an additional tilting cap or titling cover may not be included or required. Even if the sensor housing 831 is mounted in a direction ① of FIG. 8D, the imaging sensor assembly 830 may be tilted to be inclined in a direction ② of FIG. 8D while having an acute angle, due to a tilted arrangement structure of the barrel.

The sealant 860 may be disposed between the stopper 8103 of the first support member 810 and the barrel 832 to prevent foreign matter from entering into the imaging sensor assembly 830. The barrel 832 and the sealant 860 may be attached to the stopper 8103 of the first support member 810 by using double-sided tape.

The imaging sensor assembly 830 at least partially inserted into the through-hole 8104 may be electrically coupled to the printed circuit board 870 in a space between the first support member 810 and the second support member 850 by using the FPCB 833 and the connector 834.

The second support member 850 may be disposed to be at least partially in contact with the second side 8102 of the first support member 810, and at least some regions 851 may support at least part of the imaging sensor assembly 830. The region 851 of the second support member 850 may support a lower side of the sensor housing 831 without an additional tilting angle. The second support member 850 may be fixed to the second support member 810 through bonding, screw fastening, or mechanical assembling, and may support the sensor housing 831.

Figure 9A:
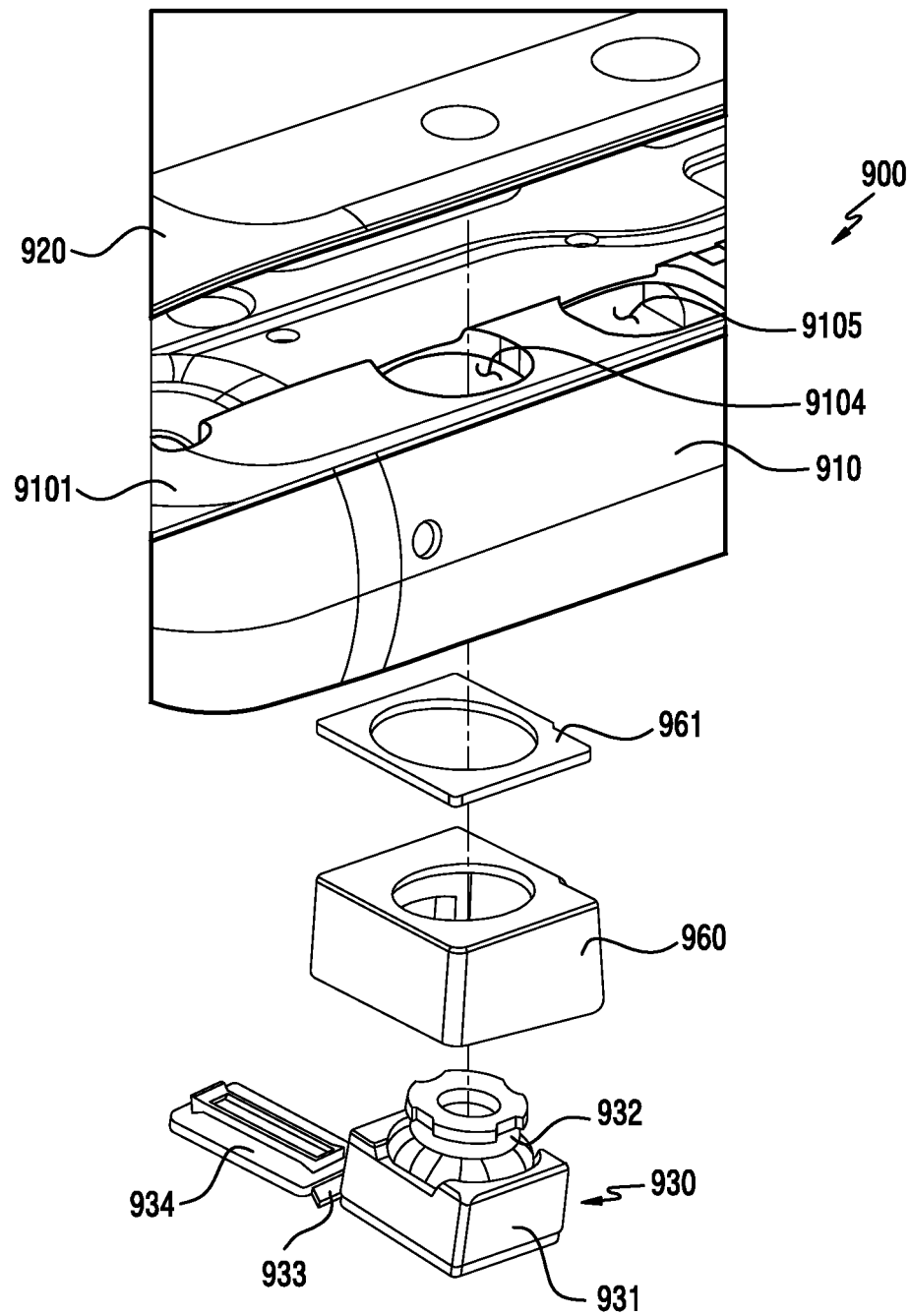
FIG. 9A is an exploded perspective view of an imaging sensor assembly, according to an embodiment.
Figure 9B:
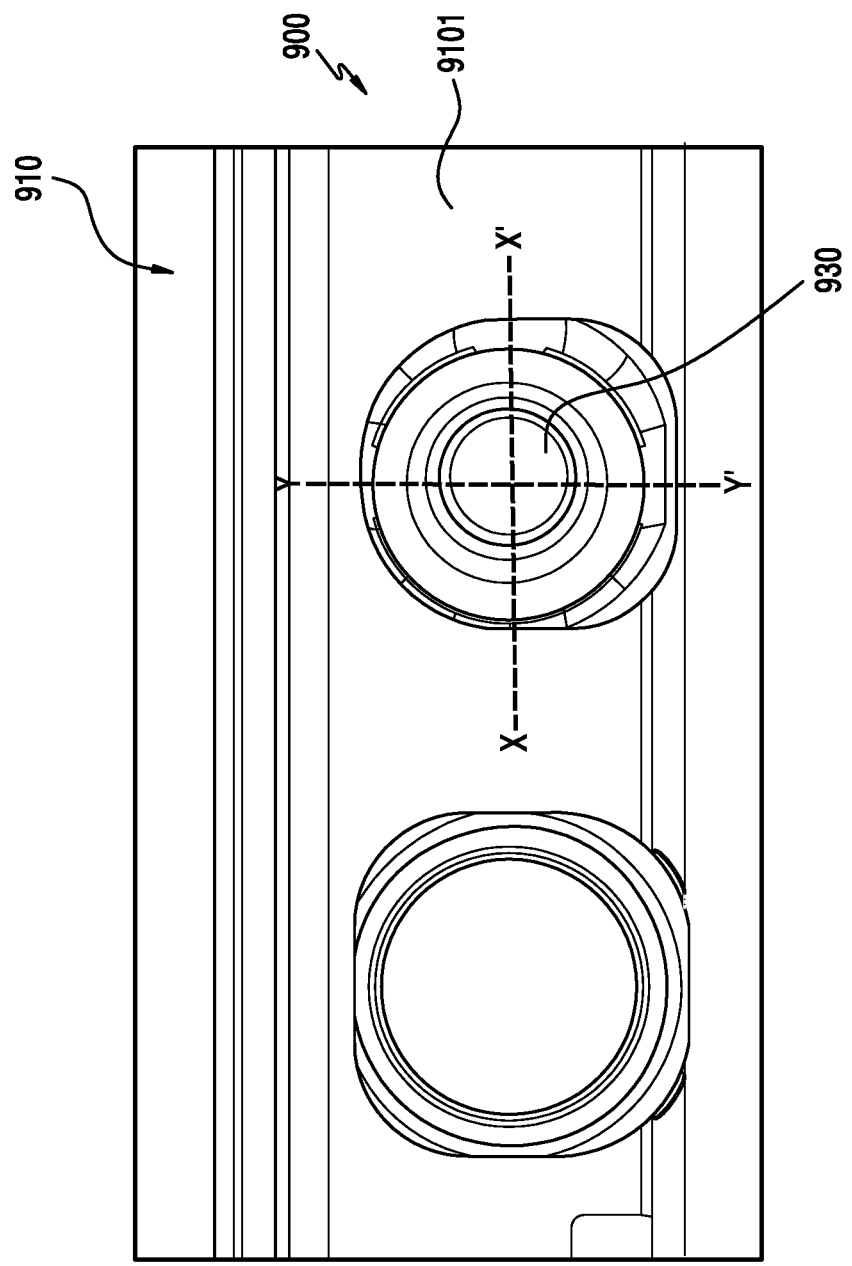
FIG. 9B is a diagram of an imaging sensor assembly that is mounted to a housing, according to an embodiment.

FIG. 9A is an exploded perspective view of an imaging sensor assembly, according to an embodiment. FIG. 9B is a diagram of an imaging sensor assembly that is mounted to a housing, according to an embodiment.

Figure 9C:
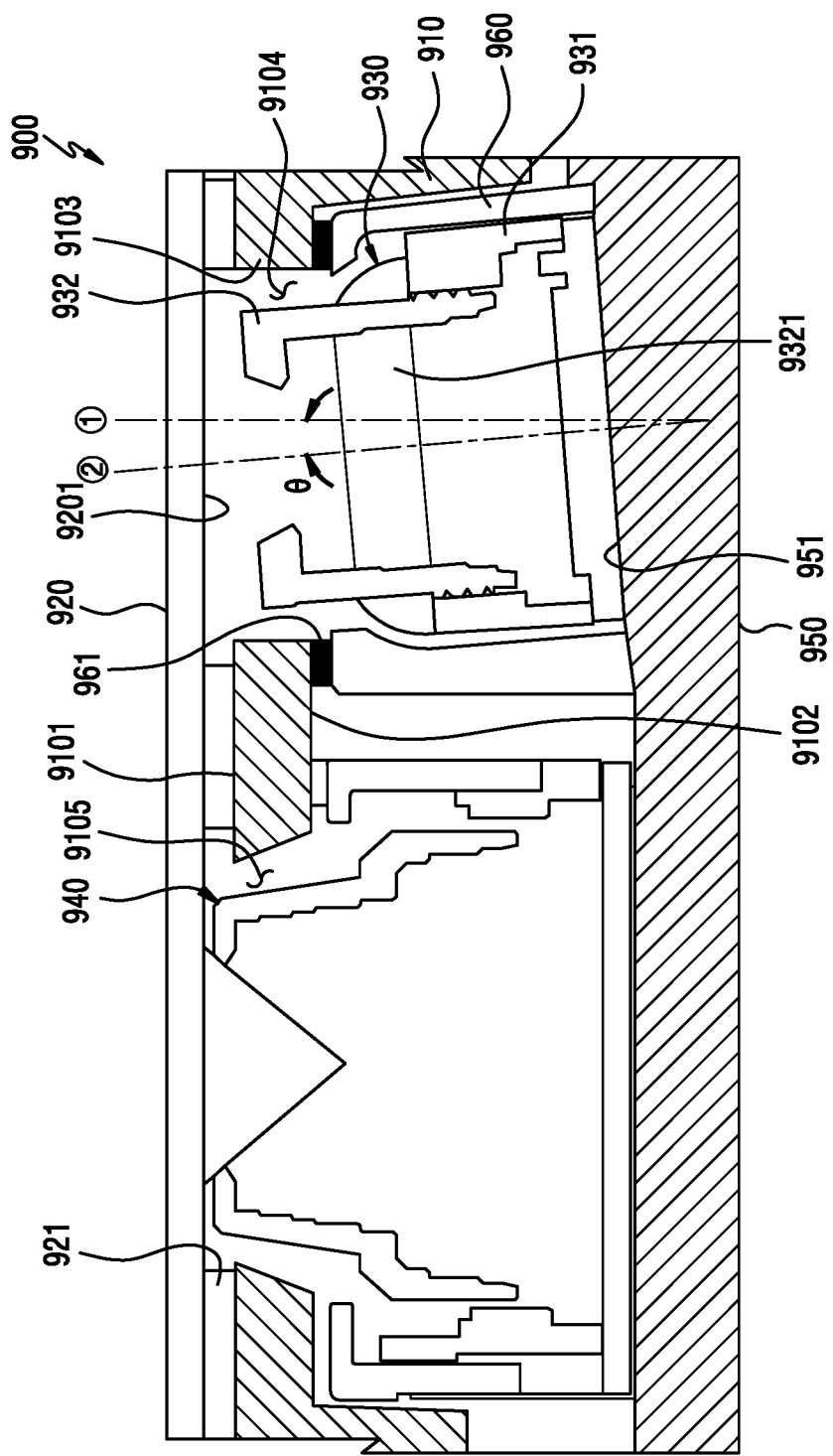
FIG. 9C is a cross-sectional view taken along the line X-X' of FIG. 9B, according to an embodiment.

Referring to FIGS. 9A, 9B and 9C, an electronic device 900 may include a first support member 910 to which a front plate 920 is disposed. The first support member 910 may include at least one through-hole 9104 or 9105 that extends up to a second side 9102 of the first support member 910 facing in a direction opposite to a first side 9101 of the first support member 910 when the front plate 920 is viewed from above. The through-hole 9104 may be used for accommodating at least part of an imaging sensor assembly 930 and the through-hole 9105 may be used for accommodating at least part of a camera 940.

The imaging sensor assembly 930 may include a barrel 932 disposed at least partially within the through-hole 9104, a plurality of lenses 9321 disposed within the barrel 932, and a sensor housing 931 that surrounds at least part of an outer surface of the barrel 932. The sensor housing 931 may include an image sensor disposed in a direction of the plurality of lenses 9321. The sensor housing 931 may be electrically coupled to an imaging sensor installed to an internal printed circuit board, and may include an FPCB 933 that extends to the outside of the sensor housing 931, and a connector 934 disposed at an end portion of the FPCB 933. The connector 934 may be used to electrically couple the imaging sensor assembly 930 to a PCB 970 of FIG. 9D disposed inside the electronic device.

The imaging sensor assembly 930 may include a sensor bracket 960 that surrounds at least part of the sensor housing 931. The imaging sensor assembly 930 may be disposed such that at least part of the barrel 932 protrudes or is exposed to the outside of the sensor bracket 960 through a portion of the sensor bracket 960. The imaging sensor assembly 930 may be tilted towards a center of the electronic device 900 due to an inclined titling structure of the through-hole 9104 provided in the first support member 910. An upper portion of the sensor bracket 960 may extends up to a stopper 9103 of the first support member 910 extended into the through-hole 9104.

A sealant 961 may be disposed between the sensor bracket 960 and the stopper 9103 of the first support member 910. The sealant 961 may perform a buffering operation or form a seal to prevent foreign matter from entering into the electronic device 900 and to protect the imaging sensor assembly 930 from external impact. The sealant 961 may be constructed of a urethane foam (e.g., poron).

Figure 9D:
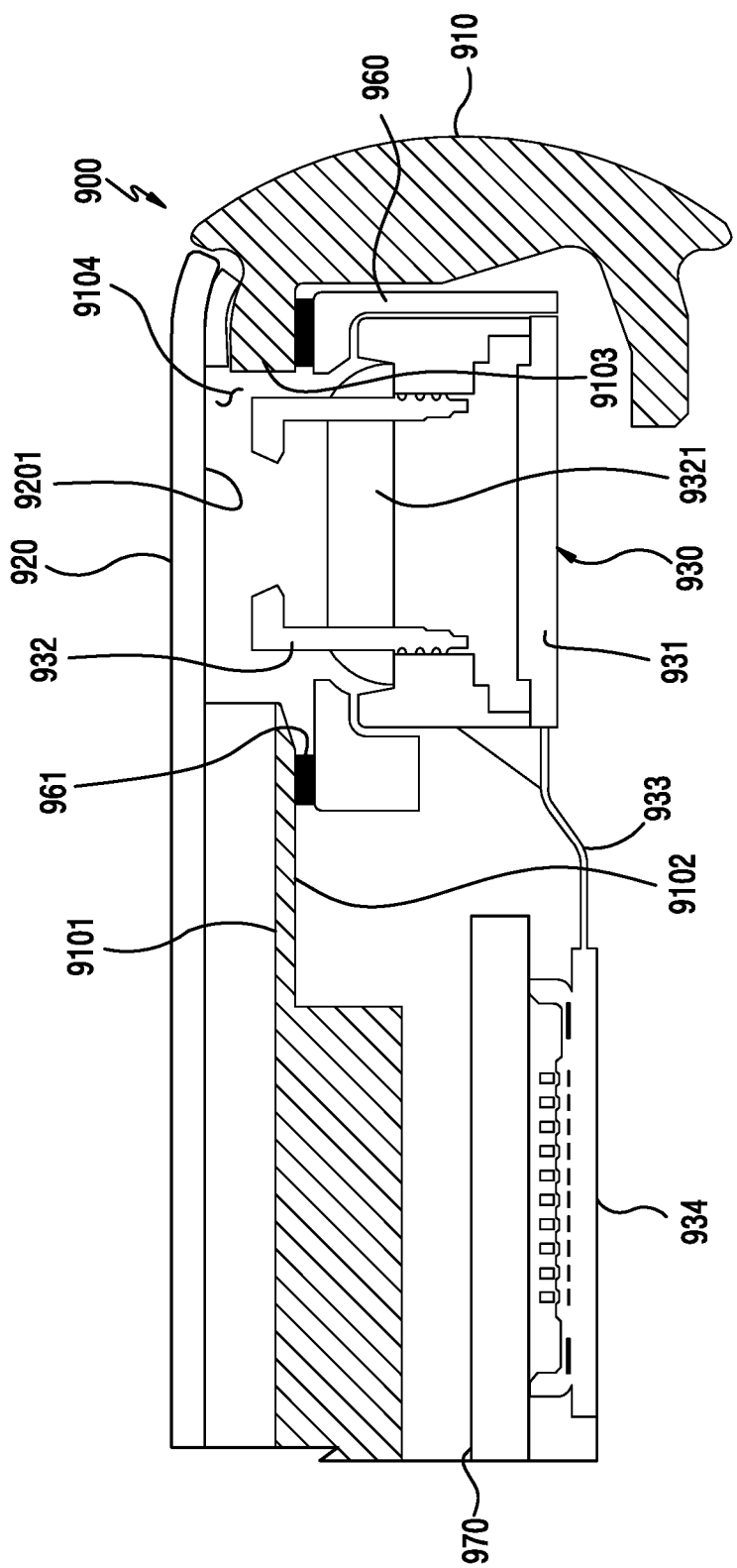
FIG. 9D is a cross-sectional view taken along the line Y-Y' of FIG. 9B, according to an embodiment.

FIG. 9C is a cross-sectional view taken along the line X-X' of FIG. 9B, according to an embodiment. FIG. 9D is a cross-sectional view taken along the line Y-Y' of FIG. 9B, according to an embodiment.

Referring to FIGS. 9C and 9D, the electronic device 900 may include the first support member 910, the front plate 920 attached through a seal member 921 (e.g., a waterproof member, an adhesive member, or a tape member) to the first side 9101 facing in a direction ① of FIG. 9C of the first support member 910, and a second support member 950 disposed in a direction facing the first side 9101 of the first support member 910. Although not shown, the electronic device 900 may further include a rear plate attached to a rear side 9201 of the first support member 950 through the seal member 921. The first support member 910 may include the through-hole 9104 disposed from the first side 9101 of the first support member 910 to the second side 9102. The first support member 910 may include another through-hole 9105 disposed with a spacer provided therebetween to accommodate the camera 940 around the through-hole 9104.

The imaging sensor assembly 930 at least partially surrounded by the sensor bracket 960 may be disposed such that at least some regions are inserted into the through-hole 9104 disposed from the first side 9101 of the first support member 910 to the second side 9102. The through-hole 9104 may be constructed such that an inner side thereof is inclined to allow the imaging sensor assembly 930 to face in the direction ②of FIG. 9C having an acute angle with respect to the direction ①of FIG. 9C. A tilting angle θ of the imaging sensor assembly 930 may be defined only with an operation in which at least part thereof is inserted into the through-hole 9104.

The first support member 910 may include the stopper 9103 extending from the first side 9101 in a direction of the through-hole 9104. The imaging sensor assembly 930 may be disposed such that at least part thereof is inserted into the through-hole 8104 and thereafter the sensor bracket 960 extends up to the stopper 9103. The stopper 9103 may be constructed to have a different thickness for each region to tilt the imaging sensor assembly 930 with the tilting angle θ. The through-hole 9104 may be constructed such that an inner side thereof is inclined to allow the imaging sensor assembly 930 to face in the direction ②of FIG. 9C having an acute angle with respect to the direction ①of FIG. 9C. However, the sensor assembly 930 may be mounted normally towards the direction ①according to an inner structure of the sensor bracket 960, and only the sensor housing 931 including the barrel 932 may be disposed to be tilted with a self-tilting angle θ inside the sensor bracket 960.

The sealant 961 may be disposed between the stopper 9103 of the first support member 910 and the sensor bracket 960 to prevent foreign matter from entering into the imaging sensor assembly 930. The sensor bracket 960 and the sealant 961 may be attached to the stopper 9103 of the first support member 910 by using double-sided tape.

The imaging sensor assembly 930 at least partially inserted into the through-hole 9104 may be electrically coupled to the printed circuit board 970 disposed into a space between the first support member 910 and the second support member 950 by using the FPCB 933 and the connector 934.

The second support member 950 may be disposed to be at least partially in contact with the second side 9102 of the first support member 910, and at least some regions 951 may support at least part of the imaging sensor assembly 930. The region 951 of the second support member 950 may be constructed to be inclined with a specific angle depending on a shape of the sensor bracket 960, or may support a lower side of the sensor housing 931 without an additional tilting angle. The second support member 950 may be fixed to the second support member 910 through bonding, screw fastening, or mechanical assembling, and may support the sensor housing 931.

Figure 10A:
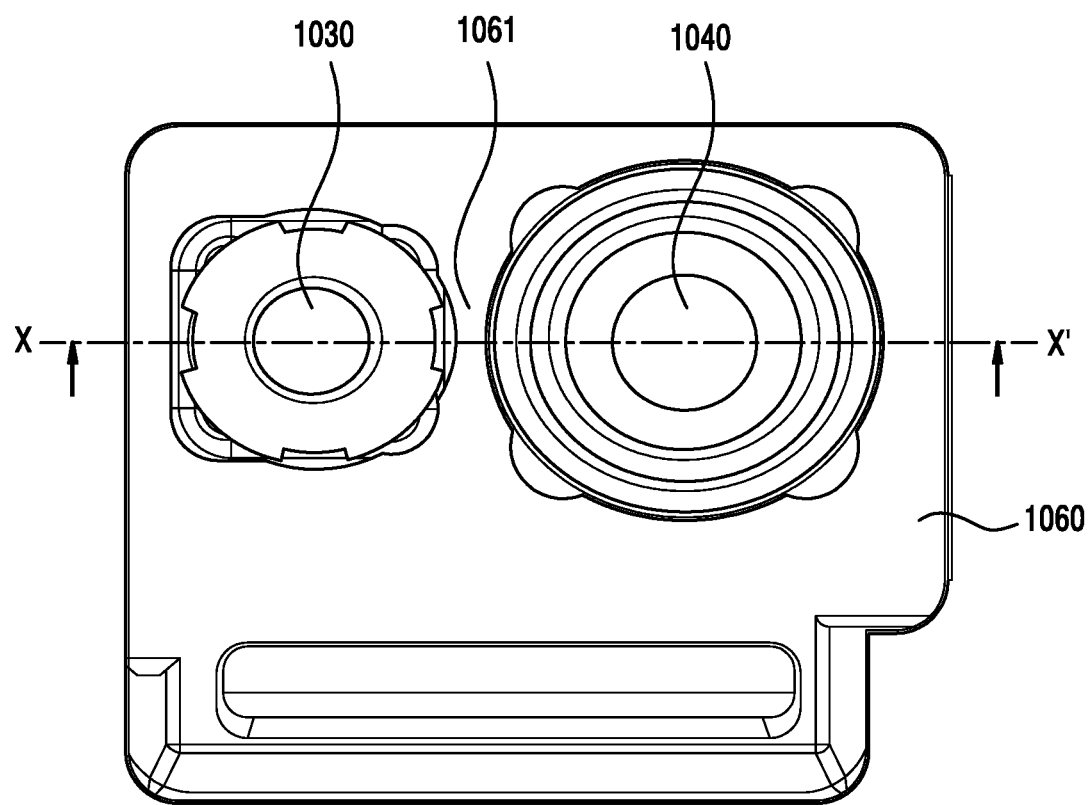
FIG. 10A is a diagram of an image sensor assembly, according to an embodiment.
Figure 10B:
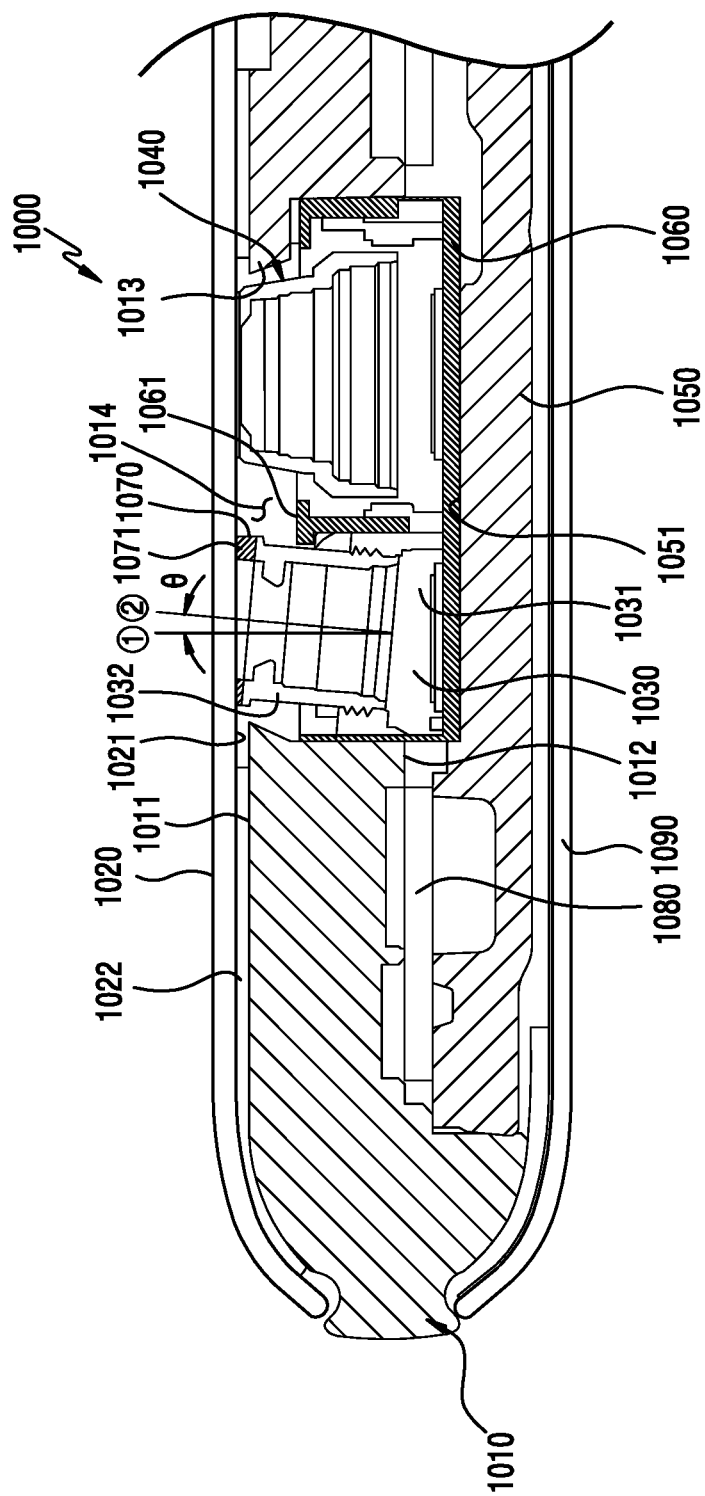
FIG. 10B is a cross-sectional view of an electronic device in which an imaging sensor assembly is arranged, taken along the line X-X' of FIG. 10A, according to an embodiment.

FIG. 10A is a diagram of an image sensor assembly, according to an embodiment. FIG. 10B is a cross-sectional view of an electronic device in which an imaging sensor assembly is arranged, taken along the line X-X' of FIG. 10A, according to an embodiment.

Referring to FIGS. 10A and 10B, an electronic device 1000 may include an imaging sensor assembly 1030 for capturing an iris or a camera 1040 disposed therearound. The imaging sensor assembly 1030 and the camera 1040 may be associated with one module housing 1060.

The electronic device 1000 may include a first support member 1010, the front plate 1020 attached through a seal member 1022 (e.g., a waterproof member, an adhesive member, or a tape member) to the first side 1011 of the first support member 1010, and a second support member 1050 disposed on a second side 1012 of the first support member 1010. The electronic device 1000 may further include a rear plate 1090 attached to the second side 1012 of the first support member 1050 through a seal member. The first support member 1010 may include a stopper 1013 extending from the first side 1011 in a direction of the through-hole 1014.

The first support member 1010 may include the through-hole 1014 disposed from a first side 1011 of the first support member 1010 to the second side 1012 of the first support member 1010 facing in a direction opposite thereto. The through-hole 1014 may be constructed to have a size for accommodating the module housing 1060 and at least some regions 1051 may support at least part of the module housing 1060.

The imaging sensor assembly 1030 may include a barrel 1032 including a plurality of lenses and a sensor housing 1031 that surrounds at least part of an outer surface of the barrel 1032. The sensor housing 1031 may include an image sensor disposed to face a direction of the plurality of lenses. The sensor housing 1031 may be electrically coupled to an image sensor installed to an internal printed circuit board and may include an FPCB that extends from outside of the sensor housing 1031, and a connector disposed at an end portion of the FPCB. The connector may be used to electrically couple the imaging sensor assembly 1030 to a printed circuit board 1080 disposed inside the electronic device 1000.

The imaging sensor assembly 1030 may be tilted in the direction ②having an acute angle with respect to the direction ①facing a first side 1011 of the first support member 1010. The module housing 1060 may include a partition 1061 for partitioning the imaging sensor assembly 1030 and the camera 1040. The partition 1061 may be constructed integrally with the module housing 1060. When the imaging sensor assembly 1030 and the camera 1040 are together, the module housing 1060 may maintain a position of the imaging sensor assembly 1030 tilted with a tilting angle θ only with a self-support structure. For example, the tilted lens barrel 1032 of the imaging sensor assembly 1030 may maintain the tilting angle θ without an additional support means through a support structure of the sensor housing 1030, based on the partition 1061 disposed into the space 1014 of the module housing 1060, and/or a support structure of the camera 1040.

The imaging sensor assembly 1030 may further include a tilting cap 1070 for compensating for an inclination gap with the barrel 1032 and the rear side 1021 of the front plate 1020, and a sealant 1071 disposed between the tilting cap 1070 and the rear side 1021 of the front plate 1020 to a foreign matter from entering the electronic device 1000.

Figure 11A:
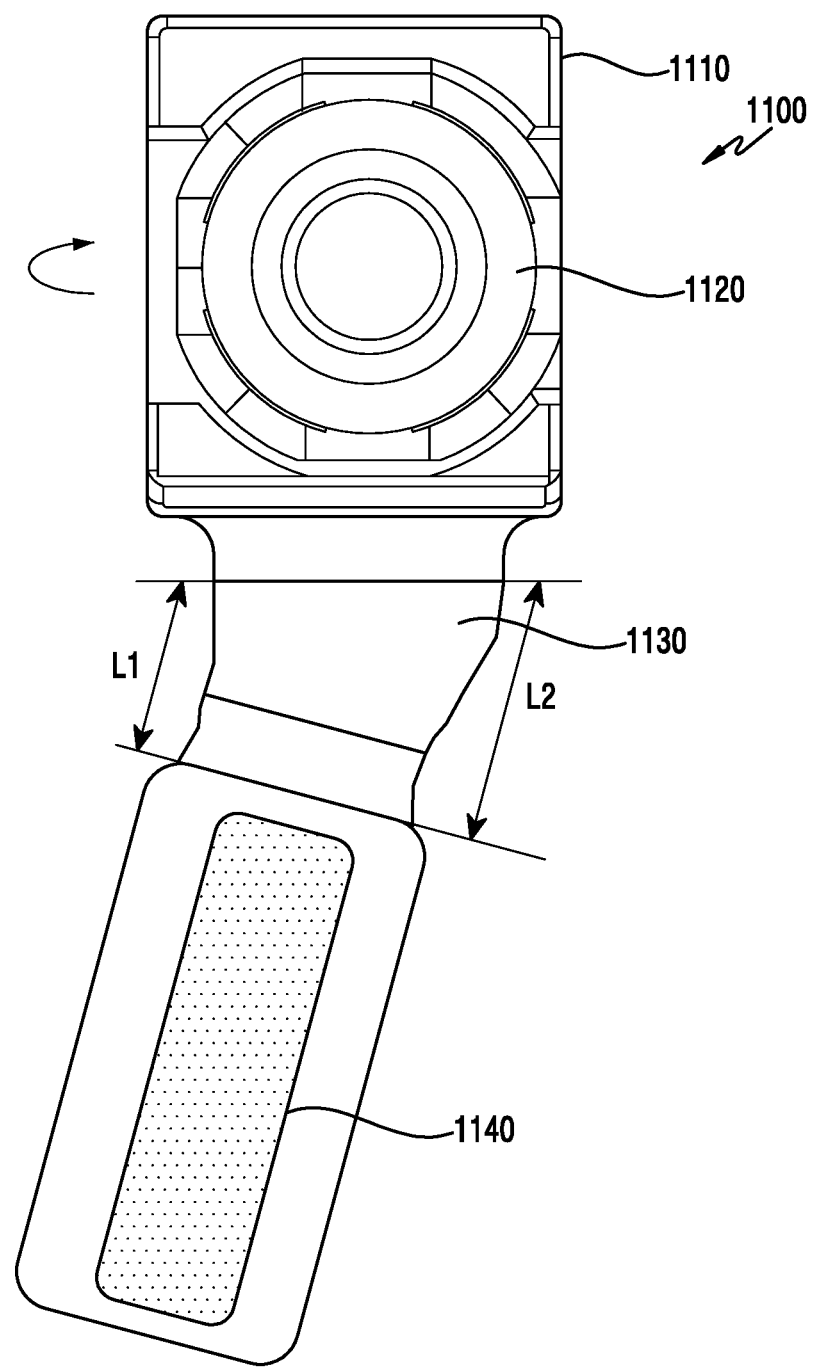
FIGS. 11A and 11B are diagrams of a structure of a flexible printed circuit board (FPCB) of an imaging sensor assembly, according to an embodiment.
Figure 11B:
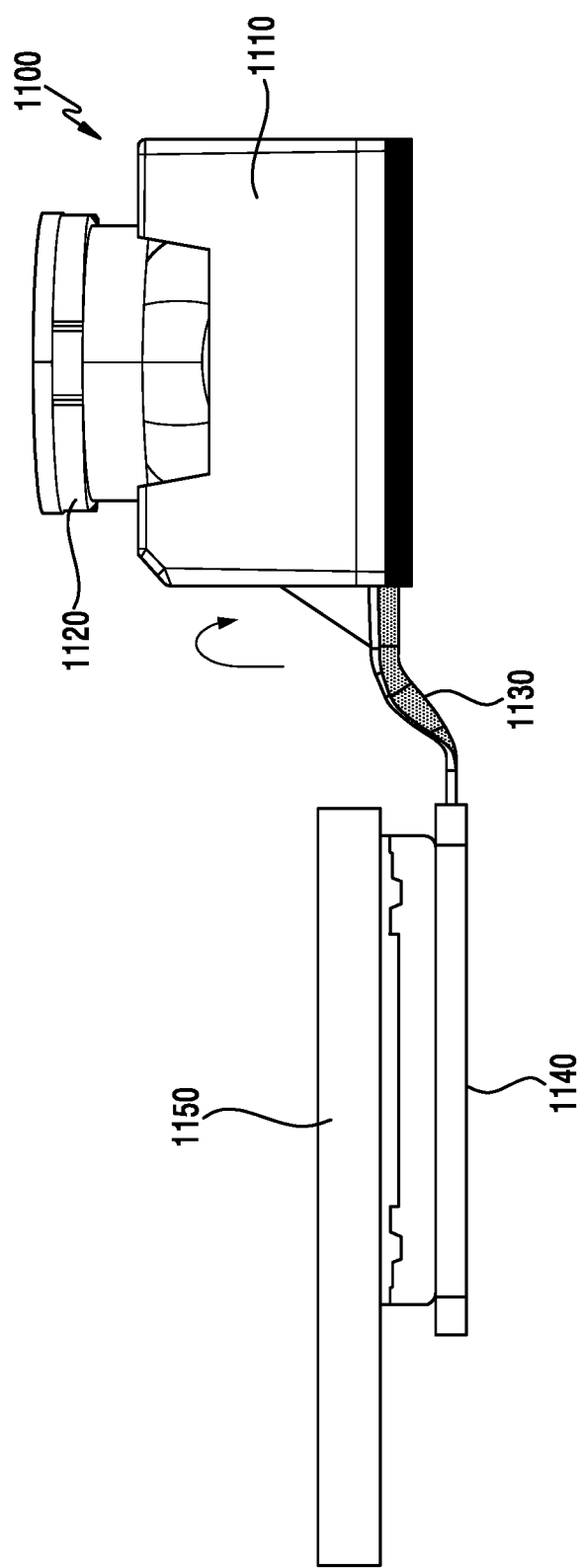

FIGS. 11A and 11B are diagrams of an FPCB of an imaging sensor assembly, according to an embodiment.

Referring to FIGS. 11A and 11B, the imaging sensor assembly 1100 may include a sensor housing 1110, a barrel 1120 including a plurality of lenses that extend from the sensor housing 1110, an FPCB 1130 that extends by a specific length from an inner side of the sensor housing 1110, and a connector 1140 disposed at an end portion of the FPCB 1130 and electrically coupled to a printed circuit board 1150 disposed inside of an electronic device.

In the FPCB 1130, a length L1 of a first side may be different from a length L2 of a second side facing the first side. The sensor housing 1110 including the barrel 1120 may be tilted at an angle A as described above. In order for the FPCB 1130 to compensate for an angle by which the sensor housing 1110 is twisted or positioned, a portion of the FPCB 1130 located in a direction opposite to a direction in which the sensor housing 1110 is twisted may be longer than a portion facing thereto. For example, when the sensor housing 1110 is tilted in a clockwise direction, in the FPCB 1130, a length L2 of a portion located in a direction opposite thereto is longer than a length L1 of a portion facing thereto. Therefore, a length by which the FPCB 1130 is twisted may be compensated for when the sensor housing 1110 is tilted.

Figure 12A:
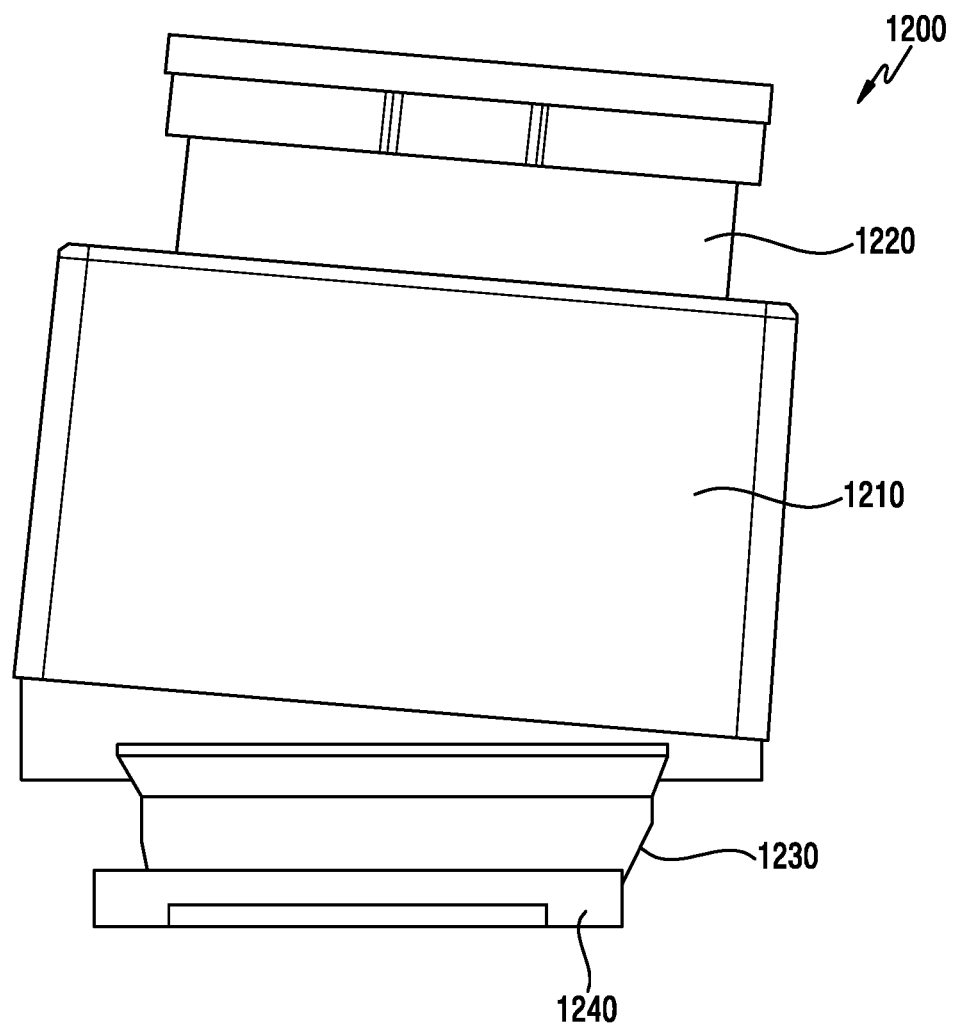
FIGS. 12A and 12B are diagrams of a structure of an imaging sensor assembly, according to an embodiment.
Figure 12B:
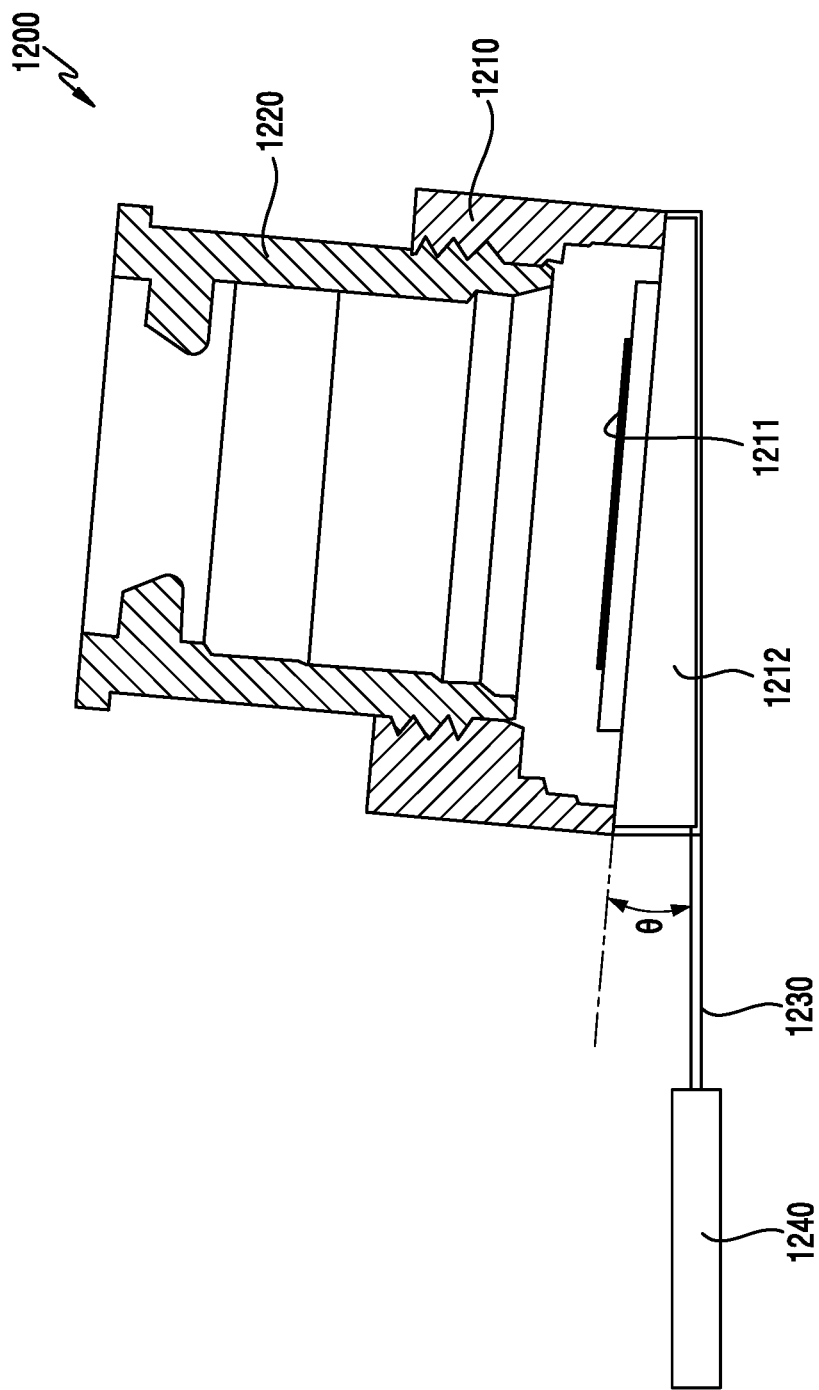

FIGS. 12A and 12B are diagrams of an imaging sensor assembly, according to an embodiment.

Referring to FIGS. 12A and 12B, the imaging sensor assembly 1200 may include a sensor housing 1210, a barrel 1220 including a plurality of lenses that extend from the sensor housing 1210, an FPCB 1230 that extends by a specific length from an inner side of the sensor housing 1210, and a connector 1240 disposed at an end portion of the FPCB 1230 and electrically coupled to a printed circuit board disposed inside an electronic device.

The imaging sensor assembly 1200 may be disposed inside the sensor housing 1210, and may include a printed circuit board 1212 constructed to have a thickness inclined with a specific angle θ. The printed circuit board 1212 may include an imaging sensor 1211 disposed to face a lens disposed inside the barrel 1220. The FPCB 1230 may be twisted or positioned based on a tilting angle of the sensor housing 1210, which can be compensated due to an inclined shape of the printed circuit board 1212 disposed inside the sensor housing 1210. For example, the FPCB 1230 may be disposed in a twisted manner to face a direction in which it is tilted by an inclination angle of the printed circuit board 1212, and when the imaging sensor assembly 1200 is substantially tilted by the aforementioned inclination angle in the electronic device, the FPCB 1230 may be substantially restored to be parallel as in its original position. The FPCB 1230 may be connected horizontally without being twisted with respect to the printed circuit board 1212 disposed inside the electronic device due to the inclination angle of the printed circuit board 1212.

The tilting structures of the imaging sensor assemblies that have been described herein can be used with the above described electronic devices, and eliminate the need of using an additional bracket or an improved bracket arrangement structure, thereby decreasing a size of the electronic device and preventing an expansion of a BM region.

An electronic device may include a housing including a front plate facing in a first direction, a rear plate facing in a direction opposite to the front plate, and a lateral member surrounding a space between the front plate and the rear plate and integrally constructed or attached with respect to the rear plate, a touch screen display exposed through a first region of the front plate, a first structure located in the space between the front plate and the rear plate and including at least one through-hole disposed to a second region of the front plate when viewed from above the front plate, a second structure located within the space and including a portion disposed between a rear plate and the second region of the front plate, and an imaging sensor assembly disposed inside the space between the second region of the front plate and the second structure while being in contact with the first structure and the second structure. The imaging sensor assembly may face the front plate in a second direction having an acute angle with respect to the first direction. The imaging sensor assembly may include a barrel at least partially disposed in the through-hole, a plurality of lenses disposed inside the barrel, a sensor housing laterally surrounding at least part of an outer surface of the barrel and in contact with at least one of the first structure and the second structure, an image sensor assembly comprising an image sensor disposed inside the sensor housing to face in the second direction, a processor disposed inside the space, and electrically coupled to the imaging sensor, and a memory disposed inside the space, electrically coupled to the processor, and storing instructions for allowing the processor to detect an iris image by using the imaging sensor when executed.

The electronic device may further include a sealant disposed between the barrel and the front plate.

The sealant may include a urethane foam.

According to various embodiments, the electronic device may include a tilting member disposed between the front plate and the barrel to compensate for an inclination space of the imaging sensor assembly which is inclined with an acute angle.

The electronic device may include a sealant disposed between the tilting member and the front plate.

The tilting member may be constructed to have the same area as an upper side of the barrel.

The tilting member may be disposed to surround at least part of the barrel.

The tilting member may be disposed such that a height thereof decreases from one end to the other end opposite to the one end.

The tilting member may include a guide protrusion to be inserted to at least one guide groove disposed along the upper side of the barrel.

The imaging sensor assembly may be mounted to be at least partially stopped at a stopper protruding into the through-hole.

The imaging sensor assembly may be mounted such that at least part of the upper side of the barrel is stopped at the stopper.

The electronic device may include a sealant disposed between the barrel and the stopper.

The imaging sensor assembly may be mounted such that at least part of the sensor housing is stopped at the stopper.

The electronic device may include a sealant disposed between the sensor housing and the stopper.

The barrel may be disposed in the second direction in the sensor housing.

The electronic device may further include a sensor bracket disposed to surround at least some regions of the imaging sensor assembly.

The imaging sensor assembly may be installed to face the first direction in the sensor bracket.

The imaging sensor assembly may include a sensor printed circuit board, disposed inside the sensor housing, to which the imaging sensor is mounted, an FPCB drawn out to the sensor housing by a specific length from the printed circuit board, and a connector disposed at an end portion of the FPCB and electrically coupled to the printed circuit board of the electronic device.

The FPCB constructed such that a lateral side opposite to a direction in which the imaging sensor assembly faces may be longer than a lateral side facing thereto.

The sensor printed circuit board may be constructed to have a slope which becomes thicker in a direction opposite to the direction in which the imaging sensor assembly faces.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An electronic device comprising:
   a housing including a front plate facing in a first direction, a rear plate facing in a direction opposite to the front plate, and a lateral member surrounding a space between the front plate and the rear plate and integrally constructed or attached with respect to the rear plate;
   a touch screen display exposed through a first region of the front plate;
   a first structure located in the space between the front plate and the rear plate and including at least one through-hole disposed to a second region of the front plate when viewed from above the front plate;
   a second structure located within the space and including a portion disposed between a rear plate and the second region of the front plate;
   an imaging sensor assembly disposed in the space between the second region of the front plate and the second structure while being in contact with the first structure and the second structure,
   wherein the imaging sensor assembly faces the front plate in a second direction at an acute angle with respect to the first direction,
   wherein the imaging sensor assembly comprises:
      a barrel at least partially disposed in the through-hole;
      a plurality of lenses disposed inside the barrel;
      a sensor housing laterally surrounding at least part of an outer surface of the barrel and in contact with at least one of the first structure and the second structure; and
      an image sensor disposed in the sensor housing to face in the second direction;
   a processor disposed in the space, and electrically coupled to the image sensor; and
   a memory disposed in the space, electrically coupled to the processor, and storing instructions for allowing the processor to detect an iris image by using the image sensor when executed,
   wherein the imaging sensor assembly comprises:
      a sensor printed circuit board, disposed inside the sensor housing, to which the imaging sensor is mounted;
      a flexible printed circuit board (FPCB) drawn out to the sensor housing by a specific length from the printed circuit board; and
      a connector disposed at an end portion of the FPCB and electrically coupled to the printed circuit board of the electronic device.

2. The electronic device of claim 1, further comprising a sealant that is disposed between the barrel and the front plate.

3. The electronic device of claim 2, wherein the sealant comprises a urethane foam.

4. The electronic device of claim 1, further comprising a tilting member that is disposed between the front plate and the barrel and configured to compensate for an inclination space of the imaging sensor assembly, which is inclined at an acute angle.

5. The electronic device of claim 4, further comprising a sealant that is disposed between the tilting member and the front plate.

6. The electronic device of claim 4, wherein the tilting member includes a same area as an upper side of the barrel.

7. The electronic device of claim 4, wherein the tilting member surrounds at least part of the barrel.

8. The electronic device of claim 4, wherein a height of the tilting member decreases from one end of the tilting member to an opposite end of the tilting member.

9. The electronic device of claim 4, wherein the tilting member comprises a guide protrusion that is inserted into at least one guide groove disposed along the upper side of the barrel.

10. The electronic device of claim 1, wherein the imaging sensor assembly extends up to a stopper protruding into the through-hole.

11. The electronic device of claim 10, wherein an upper side of the barrel extends up to the stopper.

12. The electronic device of claim 11, further comprising a sealant that is disposed between the barrel and the stopper.

13. The electronic device of claim 10, wherein t at least part of the sensor housing extends up to the stopper.

14. The electronic device of claim 13, further comprising a sealant that is disposed between the sensor housing and the stopper.

15. The electronic device of claim 1, wherein the barrel extends into in the sensor housing.

16. The electronic device of claim 1, further comprising a sensor bracket that surrounds at least part of the imaging sensor assembly.

17. The electronic device of claim 16, wherein the imaging sensor assembly faces the sensor bracket.

18. The electronic device of claim 1, wherein the FPCB is constructed such that a lateral side opposite to a direction in which the imaging sensor assembly faces is longer than a lateral side facing thereto.

19. The electronic device of claim 1, wherein the sensor printed circuit board includes a slope which becomes thicker in a direction opposite to a direction in which the imaging sensor assembly faces.

* * * * *